United States Patent
So

(10) Patent No.: US 9,851,215 B2
(45) Date of Patent: Dec. 26, 2017

(54) NAVIGATION SYSTEM WITH GEOGRAPHIC FAMILIARITY MECHANISM AND METHOD OF OPERATION THEREOF

(71) Applicant: Telenav, Inc., Santa Clara, CA (US)

(72) Inventor: Herman Ho-Man So, Redwood City, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 15/138,455

(22) Filed: Apr. 26, 2016

(65) Prior Publication Data

US 2017/0307396 A1    Oct. 26, 2017

(51) Int. Cl.
*G01C 21/36* (2006.01)
*G01C 21/34* (2006.01)

(52) U.S. Cl.
CPC ..... *G01C 21/3641* (2013.01); *G01C 21/3484* (2013.01)

(58) Field of Classification Search
CPC .................. G01C 21/3641; G01C 21/3484
See application file for complete search history.

(56) References Cited

U.S. PATENT DOCUMENTS

| | | | | |
|---|---|---|---|---|
| 7,076,741 B2* | 7/2006 | Miyaki | ............. | G01C 21/3664 715/712 |
| 2008/0167801 A1* | 7/2008 | Geelen | ............... | G01C 21/3641 701/533 |
| 2009/0157294 A1* | 6/2009 | Geelen | ............... | G01C 21/3655 701/532 |
| 2009/0164115 A1 | 6/2009 | Kosakowski et al. | | |
| 2015/0330800 A1* | 11/2015 | Huyi | .................. | G06Q 10/047 701/425 |
| 2016/0062617 A1* | 3/2016 | Isaacs | ................. | G06F 3/04845 715/738 |
| 2016/0202076 A1* | 7/2016 | Feng | ..................... | G01C 21/343 701/408 |

* cited by examiner

*Primary Examiner* — Rodney Butler
(74) *Attorney, Agent, or Firm* — IP Investment Law Group

(57) ABSTRACT

A method of operation of a navigation system includes: receiving user input regarding a navigation route for controlling guidance communication along the navigation route for a system user; generating with a control circuit a user geographic-knowledge model based on the user input regarding the navigation route; calculating a system route based on the user geographic-knowledge model; and communicating the system route for guiding the system user in traversing the system route.

20 Claims, 6 Drawing Sheets

NAVIGATION SYSTEM WITH GEOGRAPHIC FAMILIARITY MECHANISM AND METHOD OF OPERATION THEREOF

TECHNICAL FIELD

An embodiment of the present invention relates generally to a navigation system, and more particularly to a system with a geographic familiarity mechanism.

BACKGROUND ART

Modern consumer and industrial electronics, especially devices such as graphical computing systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is navigation functions for devices. However, in the midst of increase in information readily available to the user, balancing variety of features with user's familiarity of the geographic area has yet been fully utilized.

Thus, a need still remains for a navigation system with a geographic familiarity mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: receiving user input regarding a navigation route for controlling guidance communication along the navigation route for a system user; generating with a control circuit a user geographic-knowledge model based on the user input regarding the navigation route; calculating a system route based on the user geographic-knowledge model; and communicating the system route for guiding the system user in traversing the system route.

An embodiment of the present invention provides a navigation system, including: a control circuit configured to: receive user input regarding a navigation route for controlling guidance communication along the navigation route for a system user; generate a user geographic-knowledge model based on the user input regarding the navigation route; calculate a system route based on the user geographic-knowledge model; communicate the system route for guiding the system user in traversing the system route; and a storage circuit, coupled to the control circuit, configured to store the user geographic-knowledge model.

An embodiment of the present invention provides a non-transitory computer readable medium including instructions for a navigation system, including: receiving user input regarding a navigation route for controlling guidance communication along the navigation route for a system user; generating a user geographic-knowledge model based on the user input regarding the navigation route; calculating a system route based on the user geographic-knowledge model; and communicating the system route for guiding the system user in traversing the system route.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
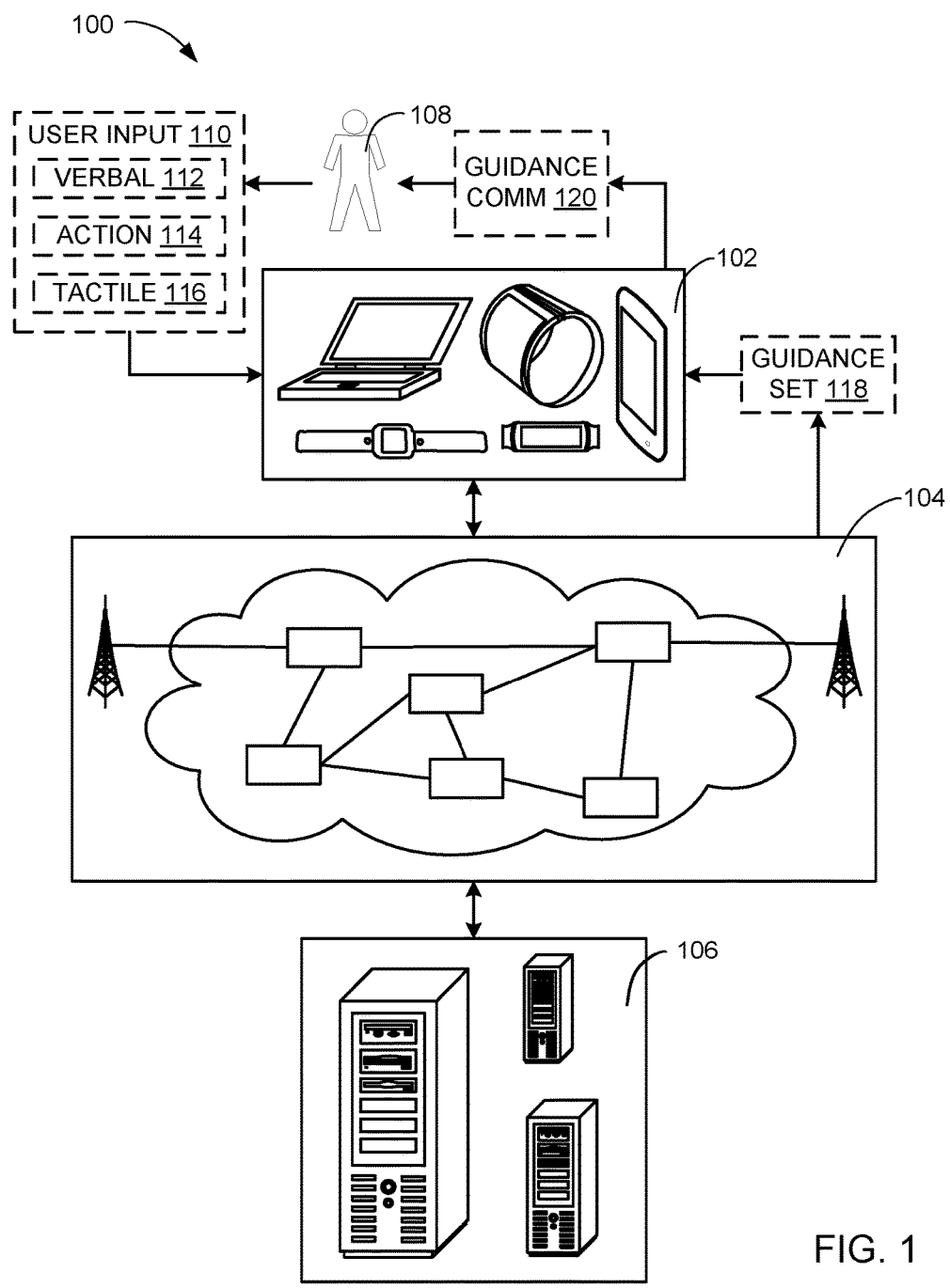
FIG. 1 is a navigation system with a geographic familiarity mechanism in an embodiment of the present invention.

The following embodiments can be for generating a user geographic-knowledge model representing familiarity or comfort level of a system user for a geographic location or area. The user geographic-knowledge model can be generated based on previously verified or utilized instances of a navigation route including one or more portions specifically controlling or limiting an amount or degree of guidance communication along the navigation route. The user geographic-knowledge model can be generated based on previously occurring user input directly controlling or verifying an active-navigation portion, a passive-navigation portion, a general-navigation portion, or a combination thereof.

The user geographic-knowledge model can be further utilized as a basis to generate a system route in subsequently assisting the system user navigation to a destination. The system route can include the one or more portions for controlling the amount or degree of the guidance communication based on familiarity or comfort level of the system user regarding the corresponding locations of the system route. Hardware status and trigger mechanism can further be processed with the system route to control hardware or processes according to specific portions and the corresponding amount or degree of the guidance communication.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof to control one or more of the hardware units or circuits.

Referring now to FIG. 1, therein is shown a navigation system 100 with a geographic familiarity mechanism in an embodiment of the present invention. The navigation system 100 can include a first device 102, such as a client or a server, connected to a second device 106, such as a client or server.

The navigation system 100 can include a system for searching or providing guidance or information associated with geographic locations, a regulatory system for enabling access to a device or a vehicle, or a combination thereof. The first device 102 can communicate with the second device 106 with a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional mobile communication or entertainment device. Also for example, the first device 102 can include a device or a sub-system.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can be used by or interact with a system user 108. The system user 108 can include a person or an entity accessing or utilizing the navigation system 100 or a device therein. For example, the system user 108 can include a person owning or operating the first device 102.

Also for example, the system user 108 can access or utilize the second device 106 through the first device 102.

The navigation system 100 can receive a user input 110 from the system user 108. The user input 110 can include a stimulus, an input, an interaction, or a combination thereof generated, provided, controlled, or a combination thereof by the system user 108 to the navigation system 100 or a device therein, such as the first device 102, the second device 106, or a combination thereof. For example, the navigation system 100 can receive the user input 110 directly on or through a user interface or a different device or portion of the first device 102, between devices such as the first device 102 and the second device 106 using communication circuits, or a combination thereof.

The navigation system 100 can receive the user input 110 in a variety of ways. For example, the navigation system 100 can receive the user input 110 including a verbal input 112, an action input 114, a tactile input 116, or a combination thereof. The verbal input 112 can include spoken or sound-based commands or inputs from the system user 108.

The action input 114 can include a motion or an action of the system user 108 sensed or detected or capable of being sensed or detected by the navigation system 100 or a device therein. The action input 114 can include the motion or the action of the system user 108 apart or separated from the navigation system 100 or a device therein. For example, the action input 114 can include motion commands visibly captured, detected, or sensed by the navigation system 100.

The tactile input 116 can include a motion or an action of the system user 108 involving a physical contact with a device for the navigation system 100. For example, the tactile input 116 can include a button or a switch being pushed or operated by the system user 108, an acceleration or a physical movement of the first device 102 detected by the first device 102, or a combination thereof. Also for example, the tactile input 116 can include a screen contact input generated by the system user 108 physically touching a touch-screen interface of the first device 102 corresponding to a possible input signal associated with the touched location of the touch-screen interface.

The navigation system 100 can provide or communicate various types of information to the system user 108. As a more specific example, the navigation system 100 can use a guidance set 118 to communicate or provide guidance communication 120 to the system user 108. The navigation system 100 can use the guidance set 118 and the guidance communication 120 therein to assist the system user 108 in traversing to and arriving at a specific location.

The guidance communication 120 is information presented to the system user 108 regarding a maneuver or an action necessary for traversing to and arriving at a specific location. The guidance communication 120 can include the navigation system 100 notifying the system user 108 to make a turn, merge or move, a location or a timing for the maneuver, or a combination thereof.

A single instance of the guidance communication 120 can correspond to a location or a timing. The guidance communication 120 can include information regarding a specific maneuver at a location along a route calculated by the navigation system 100 intended for traversal by the system user 108 in traversing to and arriving at a destination of the route.

The guidance set 118 is a collection of different instances of the guidance communication 120 necessary to guide the system user 108 along a particular route. The guidance set 118 can include different instances of the guidance communication 120 corresponding to various maneuvers, each at different locations along the route calculated by the navigation system 100, necessary to follow or traverse the route.

For example, the guidance set 118 can include a collection of audible or sound information, a collection of text or visual information, or a combination thereof corresponding to the necessary instances of the guidance communication 120 for the particular route. As a more specific example, the system user 108 can provide the user input 110 initiating the navigation system 100 to calculate the route to the destination. The navigation system 100 can calculate the route at or using the first device 102, the second device 106, or a combination thereof based on the user input 110.

Continuing with the example, the guidance set 118 can include a text file communicated from the second device 106 to the first device 102 along with or corresponding to the calculated route for providing information to the system user 108 necessary for the system user 108 to follow the calculated route. The guidance set 118 can further include a text file or a sound file generated at or using the first device 102. The first device 102 can process the guidance set 118 such as display, audibly recreate, change or convert from text to speech, or a combination thereof to communicate the instances of the guidance communication 120 to the system user 108.

For illustrative purposes, the guidance set 118 is shown as being sent to and received by the first device 102. However, it is understood that the guidance set 118 and the guidance communication 120 associated thereto can be sourced, calculated, generated, or a combination thereof at or using the first device 102.

Figure 2:
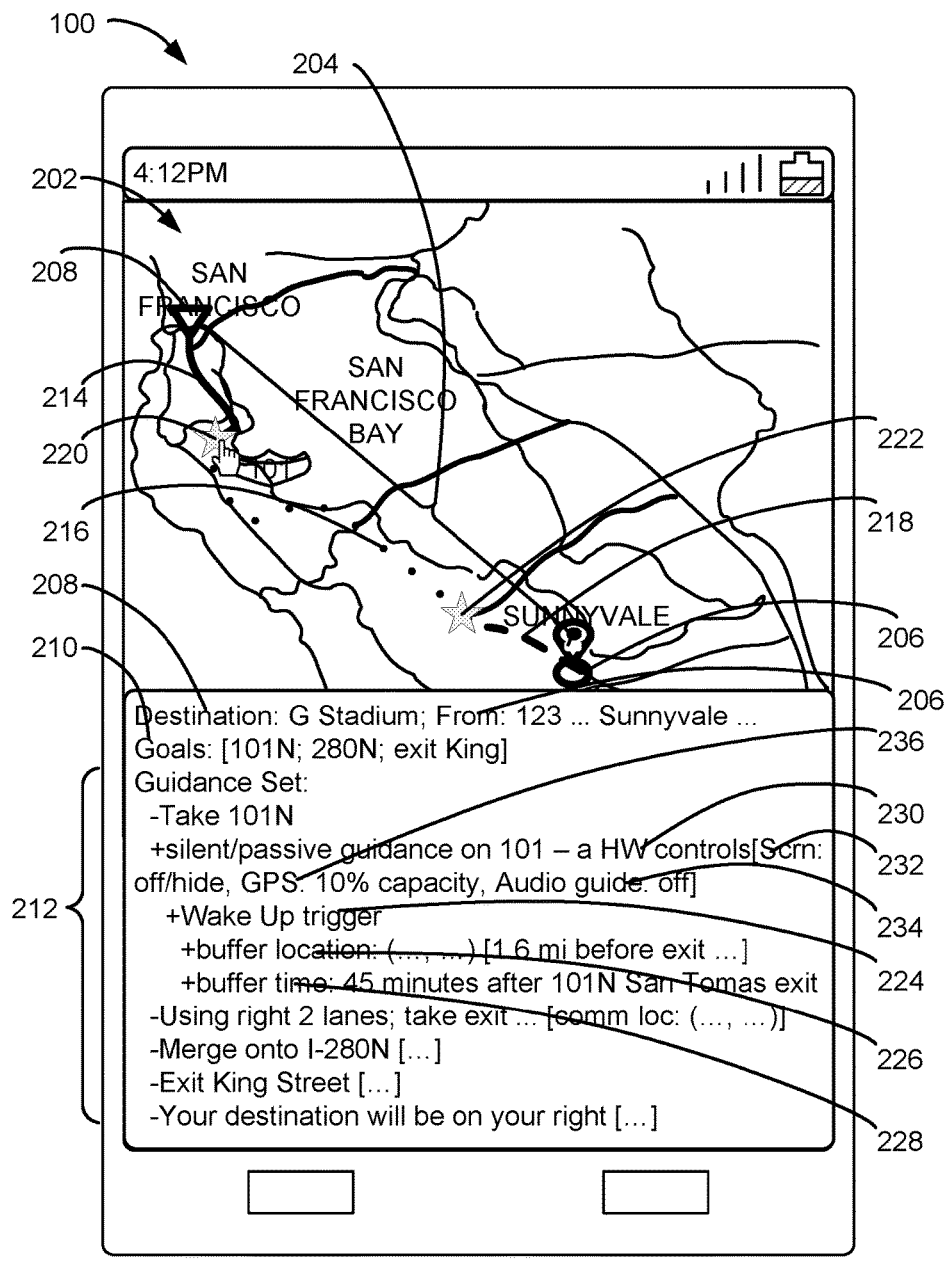
FIG. 2 is an example of a display interface of the navigation system.

Referring now to FIG. 2, therein is shown an example of a display interface of the navigation system 100. The navigation system 100 can include a map 202. The map 202 can include a representation of a geographic area and positions of things, objects, structures, positions or locations thereof, or a combination thereof in the geographic area. The map 202 can be displayed for the system user 108 of FIG. 1.

The navigation system 100 can calculate, generate, or a combination thereof for a navigation route 204 between a starting point 206 and a destination 208. The navigation system 100 can further communicate the navigation route 204, such as between devices, between a device and the system user 108, or a combination thereof.

The destination 208 can include a geographic location serving as a target, a goal, an object, or a combination thereof for a physical travel or displacement. The destination 208 can be the geographic location that the system user 108 desires to travel to or arrive at an end of traversing a path or a travel session. The destination 208 can be at the end of the navigation route 204. The destination 208 can include the geographic location requested by the system user 108, utilized as an object or a goal for a calculation or a generation process, or a combination thereof.

The starting point 206 can include a further geographic location serving as a starting location for traversing to the destination 208. The starting point 206 can include a current location of the system user 108, a different location associated with the system user 108, such as a location designated by the system user 108 or a location the system user 108 is estimated or scheduled to be at a specific time.

The navigation route 204 can include a continuous path connected to or leading up to the destination 208. The navigation route 204 can include a series of connected roads, paths, segments, lines, nodes, intersections or crossings, or a combination thereof from the starting point 206 to the destination 208.

The navigation route 204 can be represented as a set of paths, directions of travel, maneuvers, or a combination thereof. The navigation route 204 can further be represented as an overlay in or over the map 202. The navigation route 204 can be used to guide or inform the system user 108 in traversing to the destination 208.

The navigation system 100 can guide the system user 108 to traverse the navigation route 204. The navigation system 100 can guide the system user 108 the guidance communication 120 of FIG. 1 or the guidance set 118 of FIG. 1 corresponding to the navigation route 204. The navigation system 100 can generate the guidance communication 120 or the guidance set 118 corresponding to the navigation route 204.

The navigation system 100 can generate the guidance communication 120, the guidance set 118, or a combination thereof based on an intermediate goal 210, a detailed guidance 212, or a combination thereof. The intermediate goal 210 is a location or a segment within the navigation route 204 associated with higher importance or higher relative weight than other locations or segments. The intermediate goal 210 can include an object or a goal for a series of preceding travel locations, paths, maneuvers, or a combination thereof.

The navigation system 100 can generate the intermediate goal 210 for the navigation route 204 or for traversing to the destination 208 based on a variety of factors. For example, the intermediate goal 210 can be based on a type of path within the navigation route 204, such as for highways, expressways, freeways, or a combination thereof. Also for example, the intermediate goal 210 can be based on a size, a number of lanes, a popularity or a relative usage rate, or a combination thereof.

Also for example, the intermediate goal 210 can be based on a length or duration of a segment relative to a threshold or relative to other segments within the navigation route 204. As a more significant example, the intermediate goal 210 can be based on one or more segments exceeding a threshold distance of travel, a threshold estimated time of travel, or a combination thereof. Also as a more specific example, the intermediate goal 210 can be based on the longest segment corresponding to a same name, a same type or category, or a combination thereof within the navigation route 204.

Also for example, the intermediate goal 210 can be based on an estimated familiarity or recognition level for the segment or path by the system user 108 or other users. As a more specific example, the intermediate goal 210 can be based on a location visited or traversed on a number of occasions exceeding a threshold amount, previously visited or traversed within a threshold amount of time, or a combination thereof by the system user 108, other users, or a combination thereof.

The navigation system 100 can generate one or more instances of the intermediate goal 210 based on the destination 208, and then calculate the navigation route 204 based on the one or more instances of the intermediate goal 210. The navigation system 100 can further calculate the navigation route 204, and then generate one or more instances of the intermediate goal 210 based on analyzing or processing the navigation route 204.

The navigation route 204 can be based on a series or a sequential instances the intermediate goal 210. The navigation route 204 can further include segments, instances of the intermediate goal 210, maneuvers, or a combination thereof according to a hierarchy or corresponding to a weight representing an estimate importance or impact in association with the navigation route 204.

For example, the intermediate goal 210 can be to head toward a landmark or a city with the hierarchy or the weight corresponding to a high or overarching goal. The intermediate goal 210 can further include to use a specific freeway or highway in heading toward the landmark or the city. Details regarding the navigation route 204 and the intermediate goal 210 are discussed below.

The detailed guidance 212 is one or a set of specific information designed to notifying the system user 108 to follow or traverse the navigation route 204. The detailed guidance 212 can include information at a lower granularity or including an additional level of detail in comparison to the intermediate goal 210. The detailed guidance 212 can further include information for arriving or achieving the intermediate goal 210.

For example, the detailed guidance 212 can include one or more guidance instructions for a specific maneuver required or necessary to follow or traverse the navigation route 204. Also for example, the detailed guidance 212 can include a distance information, an ordinal description, such as for "first" or "second", a direction information such as "left" or "right", or a combination thereof for an upcoming maneuver or a location corresponding thereto, a landmark or a location of relevant to the navigation route 204, or a combination thereof.

The guidance communication 120, the guidance set 118, or a combination thereof can include the intermediate goal 210, the detailed guidance 212, or a combination thereof. The guidance communication 120, the guidance set 118, or a combination thereof can be used to communicate to the intermediate goal 210, the detailed guidance 212, or a combination thereof to the system user 108.

As an illustrative example, the navigation system 100 can estimate a familiarity or comfort level of the system user 108 corresponding to a geographic area, such as for traversal in or navigation through the geographic area. The navigation system 100 can limit, control, or adjust an amount of navigational information communicated to the system user 108 based on the familiarity or comfort level of the system user 108.

Continuing with the example, the navigation system 100 can use the guidance communication 120 to communicate the intermediate goal 210, such as to take a specific freeway or to head towards a major city or direction, when the system user 108 is estimated to be familiar or comfortable with the intermediate goal 210 or the associated area. The navigation system 100 can further use the guidance communication 120 to communicate the detailed guidance 212 when the system user 108 is estimated to be uncomfortable or unfamiliar with the intermediate goal 210 or the associated area. The navigation system 100 can communicate the detailed guidance 212 such as specifics for a turn, a lane, a segment name, a direction, a location or distance, or a combination thereof in guiding or leading the system user 108 to the intermediate goal 210.

The navigation system 100 can guide the system user 108 based on communicating the navigation route 204, the guidance communication 120 or the guidance set 118 corresponding thereto, or a combination thereof. The navigation system 100 can communicate the navigation route 204, the guidance communication 120, the guidance set 118, or a combination thereof between devices, such as the first device 102 of FIG. 1, the second device 106 of FIG. 1, other user devices, or a combination thereof. The navigation system 100 can communicate between devices by transmitting, receiving, further processing, or a combination thereof regarding information.

The navigation system 100 can further communicate the navigation route 204, the guidance communication 120, the guidance set 118, or a combination thereof between one or more devices and the system user 108. The navigation system 100 can communicate between the one or more devices and the system user 108 by displaying, audibly generating, providing tactile feedback, or a combination thereof regarding information using one or more interfaces or circuits of the one or more devices.

The navigation system 100 can process the navigation route 204 including an active-navigation portion 214, a passive-navigation portion 216, a general-navigation portion 218, or a combination thereof. The navigation system 100 can process the navigation route 204 by calculating and presenting the navigation route 204 including estimated or predetermined instances of the active-navigation portion 214, the passive-navigation portion 216, the general-navigation portion 218, or a combination thereof. The navigation system 100 can further process the navigation route 204 by receiving the user input 110 of FIG. 1 designating, selecting, or adjusting the active-navigation portion 214, the passive-navigation portion 216, the general-navigation portion 218, or a combination thereof for the navigation route 204.

The active-navigation portion 214 is a segment within the navigation route 204 associated with detailed level or amount of guidance for the system user 108. The active-navigation portion 214 can correspond to the detailed guidance 212. The guidance communication 120 or the guidance set 118 can include the detailed guidance 212 for the active-navigation portion 214. The active-navigation portion 214 can correspond to a geographic area unknown, unfamiliar, or uncomfortable to the system user 108.

For example, the navigation system 100 can provide the detailed guidance 212 for the system user 108 in or while traversing the active-navigation portion 214. Also for example, the navigation system 100 can utilize a full set or a detailed level of processes for detecting or obtaining information, providing output communications to the system user 108, or a combination thereof for the active-navigation portion 214.

As a more specific example, the navigation system 100 can keep the routing or navigation information displayed on a display, communicate all of the detailed guidance 212, or a combination thereof for the active-navigation portion 214. Also as a more specific example, the navigation system 100 can increase a frequency or utilize a full or highest frequency associated with calculating or updating a current location for the active-navigation portion 214. Also as a more specific example, the navigation system 100 can invoke or utilize additional or lower-granularity processes for increasing accuracy in calculating the current location for the active-navigation portion 214.

The passive-navigation portion 216 is a segment within the navigation route 204 associated with absence of guidance for the system user 108. The passive-navigation portion 216 can correspond to absence of the guidance communication 120 to the system user 108. The guidance communication 120 or the guidance set 118 can be an empty set, place holder, or silence for the passive-navigation portion 216. The passive-navigation portion 216 can correspond to a geographic area known, familiar, or comfortable to the system user 108.

For example, the navigation system 100 can be without the guidance communication 120 to the system user 108 or silent in or while traversing the passive-navigation portion 216. Also for example, the navigation system 100 can suspend or limit processes for detecting or obtaining information, providing output communications to the system user 108, or a combination thereof for the passive-navigation portion 216.

As a more specific example, the navigation system 100 can remove or hide the routing or navigation information from a display, withhold the guidance communication 120 or keep silent, or a combination thereof for the passive-navigation portion 216. Also as a more specific example, the navigation system 100 can decrease a frequency, utilize a lowest frequency, or temporarily suspend for calculating or updating a current location for the passive-navigation portion 216. Also as a more specific example, the navigation system 100 can suspend or withhold additional or lower-granularity processes for increasing accuracy in calculating the current location for the passive-navigation portion 216.

The general-navigation portion 218 is a segment within the navigation route 204 associated with general overarching level or amount of guidance for the system user 108. The general-navigation portion 218 can correspond to communication of the intermediate goal 210 without the detailed guidance 212. The guidance communication 120 or the guidance set 118 can include the intermediate goal 210 without the detailed guidance 212 for the general-navigation portion 218.

The general-navigation portion 218 can correspond to a geographic area known, familiar, or comfortable to the system user 108. The general-navigation portion 218 can further correspond to a geographic area known, familiar, or comfortable to a level between those of the active-navigation portion 214 and the passive-navigation portion 216. The general-navigation portion 218 can further correspond to a condition, a situation or a status that is abnormal, uncommon, exceptional, or a combination thereof to a geographic area known, familiar, or comfortable to the system user 108.

For example, the navigation system 100 can provide the intermediate goal 210 without the detailed guidance 212 for the system user 108 in or while traversing the general-navigation portion 218. Also for example, the navigation system 100 can provide the intermediate goal 210 for the system user 108 to deviate from his or her regular pattern or preference.

As a more specific example, the navigation system 100 can implement controls similar to the active-navigation portion 214, the passive-navigation portion 216, or a combination thereof, such as for displays, communications, or a combination thereof. Also as a more specific example, the navigation system 100 can set a frequency between ones corresponding to the active-navigation portion 214 and the passive-navigation portion 216 for calculating or updating a current location for the passive-navigation portion 216. Also as a more specific example, the navigation system 100 can implement or initiate a portion or a selected set of additional or lower-granularity processes for increasing accuracy in calculating the current location for the passive-navigation portion 216.

The navigation system 100 can implement the various portions within the navigation route 204 or control a transition between the various portions using a trigger mechanism 224. The trigger mechanism 224 is information or control associated with implementation of one or more portions within the navigation route 204 or a transition between the portions.

The trigger mechanism 224 can include a condition, a threshold, a situation, a representation thereof, or a combination thereof for initiating or implementing controls, adjustments, or a combination thereof for the active-navigation portion 214, the passive-navigation portion 216, the general-navigation portion 218, or a combination thereof for the navigation route 204. For example, the trigger mechanism 224 can include a distance, a direction, a duration, a specific location or maneuver, or a combination thereof relative to the navigation route 204 for triggering recalculation thereof.

Also for example, the trigger mechanism 224 can be for checking an end of or transitioning out of the passive-navigation portion 216. The trigger mechanism 224 can include a condition for determining or checking an end for the passive-navigation portion 216, such as using a hardware control for location calculation or verification. The trigger mechanism 224 can be based on a location, a distance, a time, or a combination thereof. As a more specific example, the trigger mechanism 224 can include a buffer location 226, a buffer time 228, or a combination thereof.

The buffer location 226 is a geographic location or zone in the navigation route 204 associated with a beginning or an end of a corresponding instance of the portion within the navigation route 204. Continuing with the example, the buffer location 226 can include the location near or within a threshold distance from the end of the passive-navigation portion 216. The buffer location 226 can be for increasing the location calculation or update frequency, initiating additional or higher accuracy location processes, or a combination thereof.

The buffer time 228 is a time or a duration associated with a beginning or an end of a corresponding instance of the portion within the navigation route 204. Continuing with the example, the buffer time 228 can be an estimated arrival or travel time corresponding to the buffer location 226 or the end of the passive-navigation portion 216. The buffer time 228 can be for checking or verifying the current location, increasing the location calculation or update frequency, initiating additional or higher accuracy location processes, or a combination thereof.

As an illustrative example, the navigation system 100 can calculate a location, a duration of travel time, an estimated arrival time, or a combination thereof corresponding to the buffer location 226, the buffer time 228, or a combination thereof for the passive-navigation portion 216. The navigation system 100 can decrease a frequency or an accuracy level for calculating the current location or suspend one or more processes or hardware controls associated thereto up to or until the system user 108 satisfies the buffer time 228, the buffer location 226, or a combination thereof. The navigation system 100 can reinstate processes or increase the frequency or the accuracy level upon satisfying the buffer time 228, the buffer location 226, or a combination thereof to verify the end of the passive-navigation portion 216.

The navigation system 100 can further implement the various portions based on controlling or setting hardware status 230. The hardware status 230 is a control signal or indication for one or more hardware within a device of the navigation system 100 or a process associated thereto. The hardware status 230 can be processed at or implemented with the first device 102, the second device 106, or a combination thereof. The hardware status 230 corresponding to the various portions can include a screen display status 232, an audible guidance status 234, a locating function status 236, or a combination thereof.

The screen display status 232 can include a control signal or indication for circuits associated with visually communicating information. The screen display status 232 can include "on" or "off" control or indication for a screen or a projector, a specific window or information, a portion therein, or a combination thereof. The screen display status 232 can further include a refresh or an update rate for displayed information corresponding to real-time status or situation. The screen display status 232 can be for turning off the screen or display, closing or hiding the navigation route 204 or the guidance communication 120, or a combination thereof.

The screen display status 232 can be generated or calculated at the first device 102, the second device 106, or a combination thereof. The screen display status 232 can further be exchanged or communicated between the first device 102 and the second device 106. The screen display status 232 can be implemented or executed at the first device 102 for controlling or limiting communication to the system user 108.

The audible guidance status 234 can include a control signal or indication for circuits associated with audibly communicating information. The audible guidance status 234 can include "on" or "off" control or indication for a speaker or a sound generator, a specific information or the guidance communication, a portion therein, or a combination thereof. The audible guidance status 234 can be for withholding or eliminating audible communication of the guidance communication 120. The audible guidance status 234 can further be for controlling or limiting generation of the guidance communication 120, the detailed guidance 212, or a combination thereof.

The audible guidance status 234 can be generated or calculated at the first device 102, the second device 106, or a combination thereof. The audible guidance status 234 can further be exchanged or communicated between the first device 102 and the second device 106. The audible guidance status 234 can be implemented or executed at the first device 102 for controlling or limiting communication to the system user 108.

The locating function status 236 can include a control signal, indication, or setting for circuits associated with locating the system user 108. The locating function status 236 can include "on" or "off" control or indication for a hardware or a process for obtaining or calculating a current location of a device associated with the system user 108. The locating function status 236 can further include controls or indications for an update frequency, a sampling rate, an accuracy or a granularity, or a combination thereof for calculating a current location.

The locating function status 236 can be generated or calculated at the first device 102, the second device 106, or a combination thereof. The locating function status 236 can further be exchanged or communicated between the first device 102 and the second device 106. The locating function status 236 can be implemented or executed at the first device 102 for controlling or limiting acquisition of the current location of the first device 102.

Figure 3:
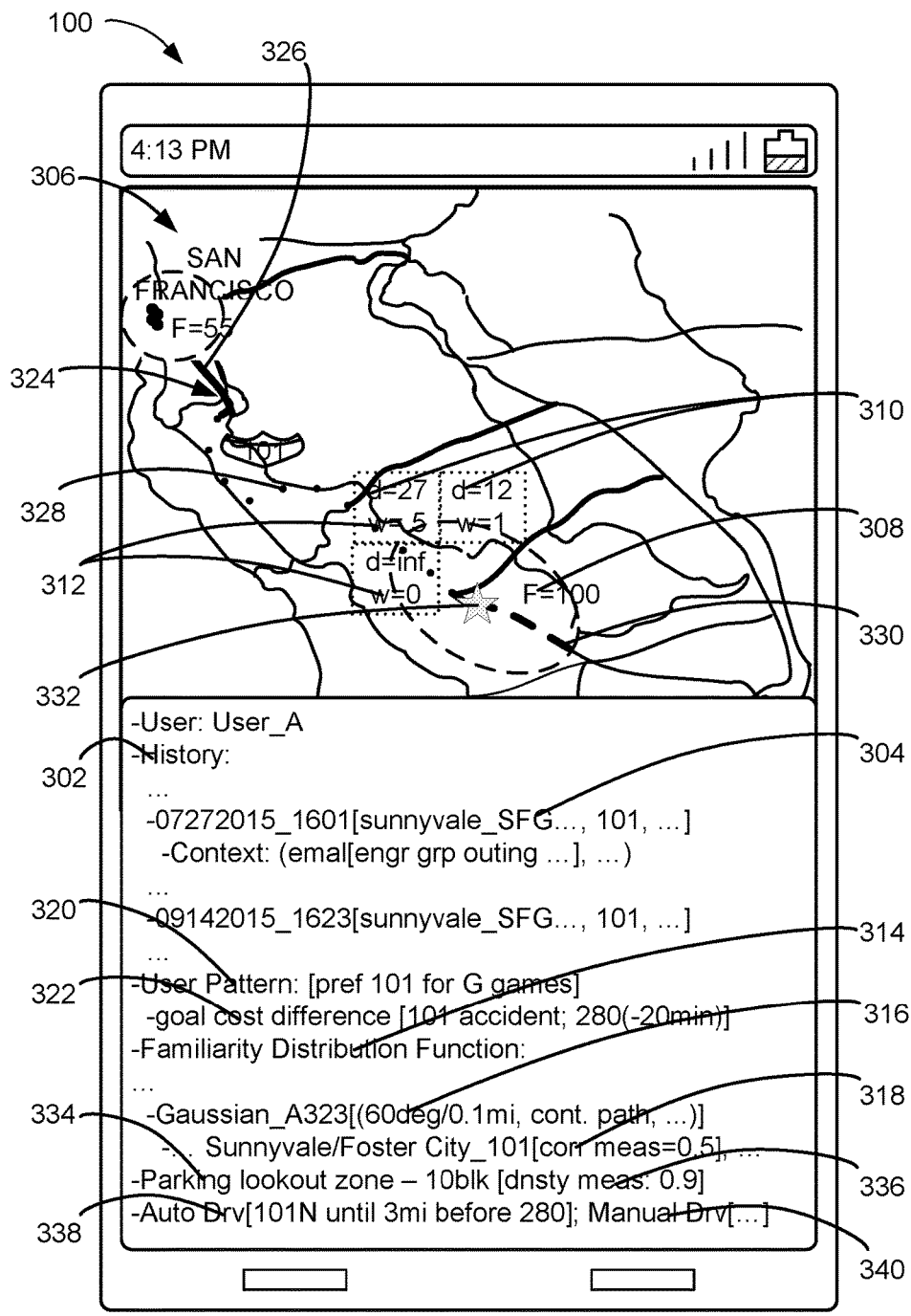
FIG. 3 is a further example of the display interface of the navigation system.

Referring now to FIG. 3, therein is shown a further example of the display interface of the navigation system 100. The navigation system 100 can process a user history 302. The user history 302 can include a record of previous geographic locations visited or occupied by the system user 108 of FIG. 1. The user history 302 can include the record corresponding to location information of the first device 102 of FIG. 1 associated with the system user 108.

The user history 302 can include a location trace, a previously requested or traversed route, a locational verification, such as accessing resources or connecting to a device at a specific location, or a combination thereof occurring prior to a current time. For example, the user history 302 can include previously occurring or utilized instances of the navigation route 204 of FIG. 2.

The user history 302 can further include information associated with previous locations. For example, the user history 302 can include search or routing requests, schedule information, communication data, or a combination thereof.

The user history 302 can further include records or information for geographic areas corresponding to the active-navigation portion 214 of FIG. 2, the passive-navigation portion 216 of FIG. 2, the general-navigation portion 218 of FIG. 2, or a combination thereof. The user history 302 can include one or more portions of the navigation route 204 corresponding to controls for the first device 102 or the guidance communication 120 of FIG. 1. The user history 302 can include the one or more portions based on validating the one or more portions of the navigation route 204, such as using the user input 110 of FIG. 1 or user's action.

The navigation system 100 can further process a user context 304. The user context 304 can include a representation of an abstract value or circumstances associated with the system user 108 regarding the navigation route 204. The user context 304 can represent a situation, a goal, a surrounding circumstance, a goal, an importance, a reason, or a combination thereof associated with the system user 108, the navigation route 204, or a combination thereof at the time of search, travel, or a combination thereof. The navigation system 100 can store the user context 304 along with the navigation route 204.

The navigation system 100 can process the user context 304 based on contextual information. For example, the navigation system 100 can utilize a current time, a current location, a traffic flow or condition at the current time, a calendar event, a known or estimated participant, a previous communication, a note or content in the calendar event or the communication, or a combination thereof to process the user context 304.

The user history 302 can include records or information for the active-navigation portion 214, the passive-navigation portion 216, the general-navigation portion 218, the user context 304 associated thereto, or a combination thereof associated or linked to a familiarity or a comfort level of the system user 108 for the corresponding geographic area or location. The navigation system 100 can process and use the user history 302 to analyze the connection between the geographic familiarity or comfort level of a location or an area.

The navigation system 100 can generate a user geographic-knowledge model 306 based on the user history 302 including previously used or verified instances of the active-navigation portion 214, the passive-navigation portion 216, the general-navigation portion 218, or a combination thereof. The user geographic-knowledge model 306 is a representation or an estimate of geographic familiarity or comfort level of the system user 108 regarding one or more geographic locations.

The user geographic-knowledge model 306 can represent or estimate a likely success of the system user 108 in navigating through or to one or more locations. The user geographic-knowledge model 306 can further represent or estimate an amount or a degree of guidance or information the system user 108 would require to navigate through or to one or more locations.

The navigation system 100 can calculate a user familiarity estimate 308 regarding a location or an area for the system user 108. The user familiarity estimate 308 is a representation or an estimate of geographic familiarity or comfort level of the system user 108 regarding a specific corresponding location or zone. The user geographic-knowledge model 306 can include the user familiarity estimate 308. The user geographic-knowledge model 306 can be an aggregate of multiple instances of the user familiarity estimate 308 each corresponding to different geographic locations or zones for one user.

The user familiarity estimate 308 can correspond to a location or a zone, such as for a set of coordinates, an entity, a building or a structure, a recognized boundary or zone, or a combination thereof for the map 202 of FIG. 2. For example, the user familiarity estimate 308 can describe or represent a familiarity or a comfort level for the system user 108 of a specific address, street corner or intersection, a business or an entity located at a specific place, a neighborhood or a city, or a combination thereof.

The user familiarity estimate 308 can correspond to a specific path or segment according to a name, a pattern thereof, a type or a category thereof, or a combination thereof. For example, the user familiarity estimate 308 can describe or represent a familiarity or a comfort level for the system user 108 of a specific street name, a naming pattern for a sequence of a set of paths, a significance or a meaning for type or a category for paths such as "road" or "boulevard", or a combination thereof.

The user geographic-knowledge model 306 can include or be based on the user familiarity estimate 308 for the system user 108 regarding various locations or areas. For example, the user geographic-knowledge model 306 can include or be based on a collection or a set of the user familiarity estimate 308 each corresponding to various geographic locations or zones. Also for example, the user geographic-knowledge model 306 can include or be based on estimations or extrapolations regarding the familiarity or comfort level for locations or zones associated with previously-visited locations in the user history 302.

The user geographic-knowledge model 306 can further include or be based on a point density 310. The point density 310 is a representation of a frequency of a number of visits corresponding to a geographic location or area. The point density 310 can be based on a limited time period or duration, such as relative to a reference time in the past, relative to the current time for defining recent visits, a duration between visits, or a combination thereof.

The point density 310 can include an aggregation of visits or travels within a specific area. The point density 310 can be processed based on analyzing the user history 302. The navigation system 100 can use the point density 310 to process the user familiarity estimate 308, the user geographic-knowledge model 306, or a combination thereof. The navigation system 100 can calculate the user familiarity estimate 308 for a specific location or area based on the point density 310 for the specific location or area.

The navigation system 100 can calculate a guidance weight 312 based on the user geographic-knowledge model 306. The guidance weight 312 is a representation of an amount or a degree of navigational assistance the system user 108 may require for a corresponding geographic location or area. The guidance weight 312 can describe or represent the corresponding geographic location or area based on the point density 310, the user familiarity estimate 308, or a combination thereof corresponding to the geographic location or area.

For example, the guidance weight 312 can be complementary or associated with the user familiarity estimate 308 of the corresponding geographic location or area. Also for example, the guidance weight 312 can include controls or indicators for selecting the active-navigation portion 214, the passive-navigation portion 216, or the general-navigation portion 218 for the navigation route 204 extending through the corresponding geographic location or area.

The navigation system 100 can further determine, utilize, process, or a combination thereof for a familiarity distribution function 314. The familiarity distribution function 314 is a method or a process for estimating or extrapolating a familiarity or comfort level of the system user 108 for locations or areas not previously visited or traversed by the system user 108. The navigation system 100 can use the familiarity distribution function 314 to calculate the user familiarity estimate 308 locations or areas not previously visited or traversed by the system user 108.

The familiarity distribution function 314 can include an equation, a set of values, a set of instructions or steps, or a combination thereof. The familiarity distribution function 314 based on a probability density function, a distribution type or model, or a combination thereof. The familiarity distribution function 314 can be based on a distance, a geographic orientation or relationship, a logical connection or relationship, a common characteristic or categorization, or a combination thereof between geographic locations.

For example, the familiarity distribution function 314 can represent a higher familiarity level or comfort level for a location relatively near or in line of sight to another location previously visited by or familiar to the system user 108 in comparison to another location further away or not within a line of sight. Also for example, the familiarity distribution function 314 can represent a higher familiarity or comfort level for paths or locations with same name or logical connections to other known or familiar locations.

The navigation system 100 can determine the familiarity distribution function 314 based on map data, the user history 302, the user context 304, or a combination thereof. For example, the familiarity distribution function 314 can be based on continuity of a path, a commonality or a change in a path name or type, a degree of turn within the path, a number of adjoining paths in an intersection, an angle between adjoining paths in the intersection, or a combination thereof. Also for example, the familiarity distribution function 314 can be based on a distance between a known or familiar location and the corresponding location or area.

Also for example, the familiarity distribution function 314 can be based on a number of mistakes or reroute requests associated thereto, a number of reported accidents, or a combination thereof for the corresponding location measured or detected across multiple users. Also for example, the familiarity distribution function 314 can be based on comments or texts including complaints or reviews on social networking services or communications between users, images, or a combination thereof connected to a visibility or a level of difficulty for recognizing signs or landmarks.

The navigation system 100 can calculate the user familiarity estimate 308 for unknown locations or locations previously not visited by the system user 108 using the familiarity distribution function 314. The navigation system 100 can generate the user geographic-knowledge model 306 to include the user familiarity estimate 308 for unknown locations or locations previously not visited by the system user 108 based on determining and processing the familiarity distribution function 314.

The navigation system 100 can further determine a user driving pattern 320. The user driving pattern 320 can include a recognizable arrangement or occurrence in locations traveled by the system user 108, the user context 304 associated with the travel, or a combination thereof. For example, the user driving pattern 320 can include a particular path or a category of paths preferred by the system user 108, a time or a contextual factor associated thereto, or a combination thereof. Also for example, the user driving pattern 320 can include a time or a duration associated with commonly repeated travel, such as start and end time for work or school associated with the system user 108.

The user driving pattern 320 can be used to calculate a goal-cost difference 322. The goal-cost difference 322 is a calculated amount of difference in resources associated with traversing different routes or segments. The goal-cost difference 322 can include an amount of delay, a distance, a monetary cost, an amount of fuel or energy expenditure, or a combination thereof associated with traversing one path or segment instead of another path or segment.

The navigation system 100 can use the goal-cost difference 322 to notify the system user 108 to deviate from the user driving pattern 320. The navigation system 100 can use the goal-cost difference 322 in notifying the system user 108 of relevant traffic conditions, initiating rerouting or route adjusting processes, or a combination thereof.

The navigation system 100 can use the user geographic-knowledge model 306 to calculate, generate, communicate, or a combination thereof for a system route 324. The system route 324 is the navigation route 204 generated by the navigation system 100 and presented to the system user 108. The system route 324 can become the navigation route 204 based on verification, acceptance, or compliance from or by the system user 108.

For example, the navigation system 100 can generate and communicate the system route 324 to the system user 108. The system user 108 can provide the user input 110 to verify the system route 324. The navigation route 204 can be the system route 324 verified by the system user 108, including any modifications by the system user 108.

The system route 324 can include a system-active portion 326, a system-passive portion 328, a system-general portion 330, or a combination thereof. The system-active portion 326 is one or more segments of the system route 324 corresponding to an initial estimate for the active-navigation portion 214 calculated or generated by the navigation system 100. The system-active portion 326 can include the segment within the system route 324 designated by the navigation system 100 to provide detailed level or amount of guidance for the system user 108.

The system-passive portion 328 is one or more segments of the system route 324 corresponding to an initial estimate for the passive-navigation portion 216 calculated or generated by the navigation system 100. The system-passive portion 328 can include the segment within the system route 324 designated by the navigation system 100 to be absent of guidance for the system user 108.

The system-general portion 330 is one or more segments of the system route 324 corresponding to an initial estimate for the general-navigation portion 218 calculated or generated by the navigation system 100. The system-general portion 330 can include the segment within the system route 324 designated by the navigation system 100 to provide general over-arching level or amount of guidance for the system user 108.

The navigation system 100 can generate the system route 324 including one or more portions. The navigation system 100 can communicate, such as visually or audibly, the system route 324. The system user 108 can provide the user input 110 for adjusting one or more portions, such as for changing a starting or an ending location, including the guidance-start location 220 of FIG. 2 or the guidance-end location 222 of FIG. 2, for one or more portions with specific amount or degree of guidance, adding or deleting one or more portions with specific amount or degree of guidance, or a combination thereof.

After adjusting the system route 324, the system user 108 can further provide the user input 110 to verify the system route 324. Based on the verification, the system-active portion 326, along with any adjustment by the system user 108, can become or be processed as the active-navigation portion 214. Similarly, the system-passive portion 328 can become or be processed as the passive-navigation portion 216, and the system-general portion 330 can become or be processed as the general-navigation portion 218, based on the verification and any applicable adjustments from the system user 108.

The navigation system 100 can further process and utilize a goal-achievement estimate 332. The goal-achievement estimate 332 is an estimate or a projection associated with actions or travels of the system user 108 for the general-navigation portion 218. The goal-achievement estimate 332 can include a geographic location, an action or a maneuver associated thereto, or a combination thereof the system user 108 will likely access or use to accomplish the intermediate goal 210 of FIG. 2.

For example, the goal-achievement estimate 332 can include the specific entrance, exit, or intersection the system user 108 will likely use or access to enter or exit a particular path in achieving or completing the intermediate goal 210. Also for example, the goal-achievement estimate 332 can include an estimated route or an estimated time of arrival for achieving or completing the intermediate goal 210.

Since the detailed guidance 212 of FIG. 2 is not provided in the general-navigation portion 218, the navigation system 100 can generate the goal-achievement estimate 332 to estimate the geographic location associated with the intermediate goal 210. The navigation system 100 can utilize the goal-achievement estimate 332 to process subsequent navigation instructions or other subsequent portions for the system route 324.

The system route 324 can further include a parking lookout zone 334. The parking lookout zone 334 is a portion of the system route 324 for alerting or assisting the system user 108 in looking for a location or a facility to park the user's vehicle. The parking lookout zone 334 can precede the destination 208 of FIG. 2 or a stopping point in the system route 324.

The navigation system 100 can search for a parking spot, notify the system user 108 to look for a parking spot, maneuver the vehicle or control a functionality thereof in association with parking the vehicle, or a combination thereof using the parking lookout zone 334. The navigation system 100 can use the parking lookout zone 334 to prevent the system user 108 from looking for parking in areas with low probability of finding a parking spot.

The navigation system 100 can process the parking lookout zone 334 based on a destination density measure 336. The destination density measure 336 is a representation of an amount of users or vehicles within a geographic area. The destination density measure 336 can be based on an equation utilizing time as input, a historical record, or a combination thereof. The destination density measure 336 can further be based on context associated with the geographic area, such as an event or an occasion.

The system route 324 can further include an automatic drive portion 338, a user-maneuver portion 340, or a combination thereof. The automatic drive portion 338 can include one or more portions of the system route 324 for operating or controlling self-driving vehicles or for utilizing driving-assistance feature for the vehicle instead of or along with maneuvering control from the system user 108. The user-maneuver portion 340 can include one or more portions of the system route 324 for operating or controlling the vehicle based on controls from the system user 108, instead of or without the self-driving feature.

Figure 4:
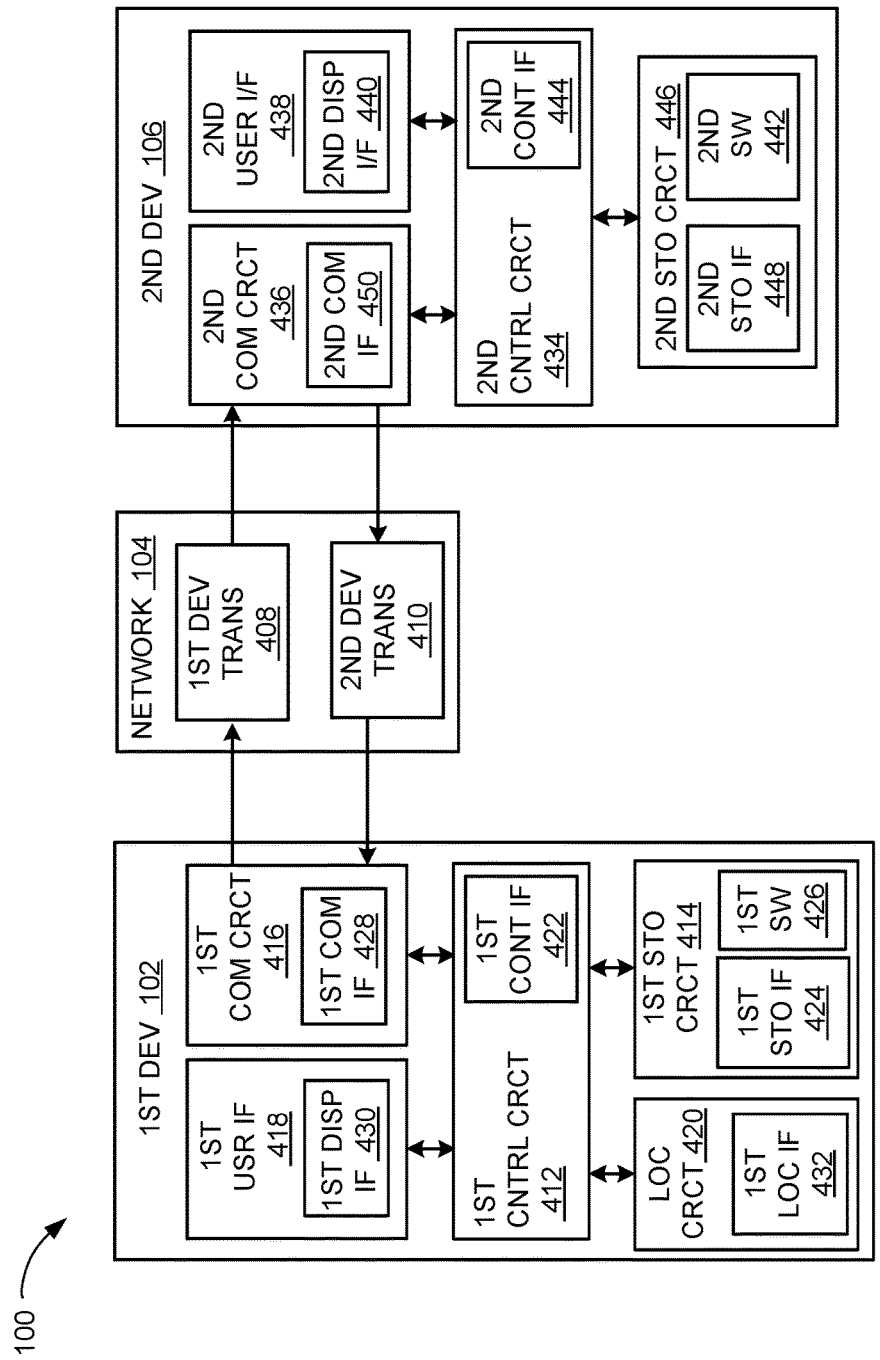
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 412, a first storage circuit 414, a first communication circuit 416, and a first user interface 418, and a location circuit 420. The first control circuit 412 can include a first control interface 422. The first control circuit 412 can execute a first software 426 to provide the intelligence of the navigation system 100.

The first control circuit 412 can be implemented in a number of different manners. For example, the first control circuit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control circuit 412 and other functional units or circuits in the first device 102. The first control interface 422 can also be used for communication that is external to the first device 102.

The first control interface 422 can receive information from the other functional units/circuits or from external sources, or can transmit information to the other functional units/circuits or to external destinations. The external sources and the external destinations refer to sources and destinations external to the first device 102.

The first control interface 422 can be implemented in different ways and can include different implementations depending on which functional units/circuits or external units/circuits are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage circuit 414 can store the first software 426. The first storage circuit 414 can also store the relevant information, such as data representing incoming images, data representing previously presented image, sound files, or a combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the first storage circuit 414 and other functional units or circuits in the first device 102. The first storage interface 424 can also be used for communication that is external to the first device 102.

The first storage interface 424 can receive information from the other functional units/circuits or from external sources, or can transmit information to the other functional units/circuits or to external destinations. The external sources and the external destinations refer to sources and destinations external to the first device 102.

The first storage interface 424 can include different implementations depending on which functional units/circuits or external units/circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 can permit the first device 102 to communicate with the second device 106 of FIG. 1, an attachment, such as a peripheral device or a desktop computer, and the network 104.

The first communication circuit 416 can also function as a communication hub allowing the first device 102 to function as part of the network 104 and not limited to be an end point or terminal circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional units or circuits in the first device 102. The first communication interface 428 can receive information from the other functional units/circuits or can transmit information to the other functional units or circuits.

The first communication interface 428 can include different implementations depending on which functional units or circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control circuit 412 can operate the first user interface 418 to display information generated by the navigation system 100. The first control circuit 412 can also execute the first software 426 for the other functions of the navigation system 100, including receiving location information from the location circuit 420. The first control circuit 412 can further execute the first software 426 for interaction with the network 104 via the first communication circuit 416.

The location circuit 420 can generate location information, current heading, current acceleration, and current speed of the first device 102, as examples. The location circuit 420 can be implemented in many ways. For example, the location circuit 420 can function as at least a part of the global positioning system, an inertial navigation system, a cellular-tower location system, a pressure location system, or any combination thereof. Also, for example, the location circuit 420 can utilize components such as an accelerometer or global positioning system (GPS) receiver.

The location circuit 420 can include a first location interface 432. The first location interface 432 can be used for communication between the location circuit 420 and other functional units or circuits in the first device 102. The first location interface 432 can also be used for communication external to the first device 102.

The first location interface 432 can receive information from the other functional units/circuits or from external sources, or can transmit information to the other functional units/circuits or to external destinations. The external sources and the external destinations refer to sources and destinations external to the first device 102.

The first location interface 432 can include different implementations depending on which functional units/circuits or external units/circuits are being interfaced with the location circuit 420. The first location interface 432 can be implemented with technologies and techniques similar to the implementation of the first control circuit 412.

The second device 106 can be optimized for implementing an embodiment of the present invention in a multiple device embodiment with the first device 102. The second device 106 can provide the additional or higher performance processing power compared to the first device 102. The second device 106 can include a second control circuit 434, a second communication circuit 436, a second user interface 438, and a second storage circuit 446.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the navigation system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the navigation system 100, including operating the second communication circuit 436 to communicate with the first device 102 over the network 104.

The second control circuit 434 can be implemented in a number of different manners. For example, the second control circuit 434 can be a processor, an embedded processor, a microprocessor, hardware control logic, a hardware finite state machine (FSM), a digital signal processor (DSP), or a combination thereof.

The second control circuit 434 can include a second control interface 444. The second control interface 444 can be used for communication between the second control circuit 434 and other functional units or circuits in the second device 106. The second control interface 444 can also be used for communication that is external to the second device 106.

The second control interface 444 can receive information from the other functional units/circuits or from external sources, or can transmit information to the other functional units/circuits or to external destinations. The external sources and the external destinations refer to sources and destinations external to the second device 106.

The second control interface 444 can be implemented in different ways and can include different implementations depending on which functional units/circuits or external units/circuits are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the information such as data representing incoming images, data representing previously presented image, sound files, or a combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the navigation system 100 is shown with the second storage circuit 446 as a single hierarchy storage system, although it is understood that the navigation system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the second storage circuit 446 and other functional units or circuits in the second device 106. The second storage interface 448 can also be used for communication that is external to the second device 106.

The second storage interface 448 can receive information from the other functional units/circuits or from external sources, or can transmit information to the other functional units/circuits or to external destinations. The external sources and the external destinations refer to sources and destinations external to the second device 106.

The second storage interface 448 can include different implementations depending on which functional units/circuits or external units/circuits are being interfaced with the second storage circuit 446. The second storage interface 448 can be implemented with technologies and techniques similar to the implementation of the second control interface 444.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal unit or circuit to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional units or circuits in the second device 106. The second communication interface 450 can receive information from the other functional units/circuits or can transmit information to the other functional units or circuits.

The second communication interface 450 can include different implementations depending on which functional units or circuits are being interfaced with the second communication circuit 436. The second communication interface 450 can be implemented with technologies and techniques similar to the implementation of the second control interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The navigation system 100 can be executed by the first control circuit 412, the second control circuit 434, or a combination thereof. For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional units or circuits not shown in FIG. 4 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
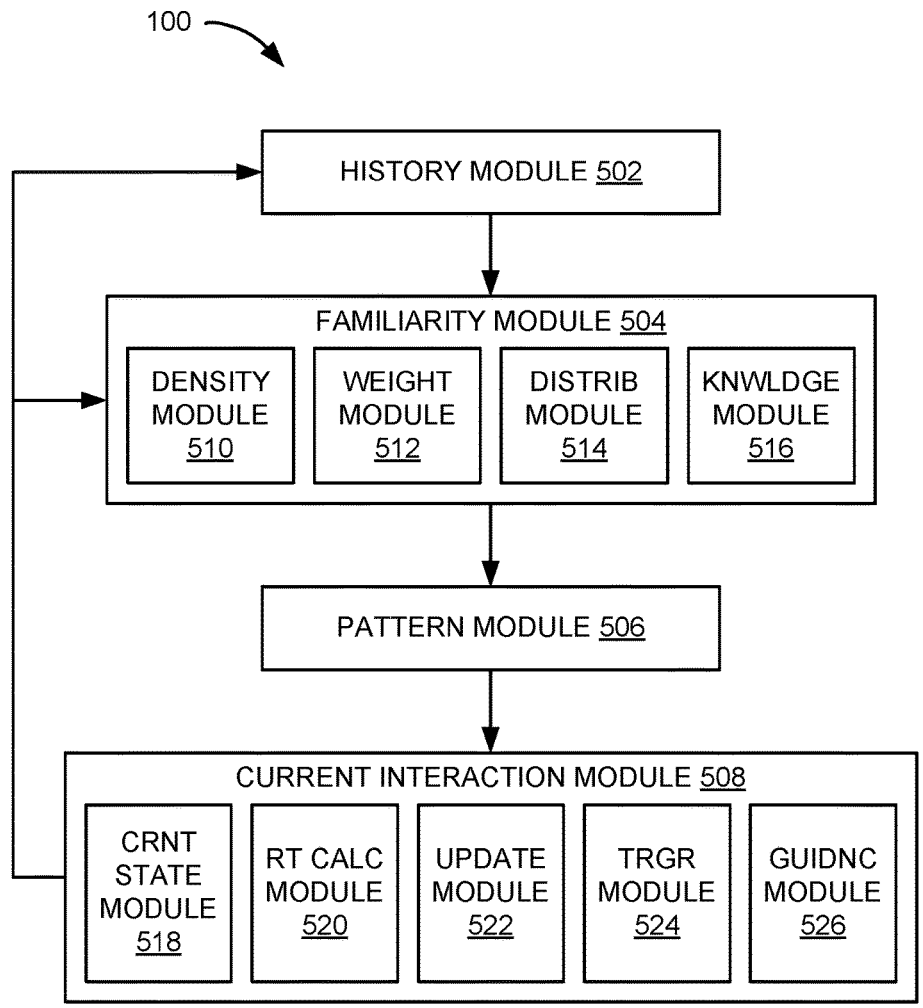
FIG. 5 is a control flow of the navigation system.

Referring now to FIG. 5, therein is shown a control flow of the navigation system 100. The navigation system 100 can include a history module 502, a familiarity module 504, a pattern module 506, a current interaction module 508, or a combination thereof.

The history module 502 can be coupled to the familiarity module 504. The familiarity module 504 can be coupled to the pattern module 506. The pattern module 506 can be coupled to the current interaction module 508. The current interaction module 508 can be further coupled to the history module 502.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The history module 502 is configured to record and manage information regarding previous locations and movements of the system user 108 of FIG. 1. The history module 502 can record and manage information by determining the user history 302 of FIG. 3. The history module 502 can determine the user history 302 by storing and updating various location related information, such as location trace, previous routes, search requests, the user context 304 of FIG. 3 associated thereto, various levels of guidance for the locations, or a combination thereof.

The history module 502 can record and manage information from the current interaction module 508. For example, the history module 502 can determine the user history 302 based on the system route 324 of FIG. 3, the system-active portion 326 of FIG. 3 therein, the system-passive portion 328 of FIG. 3 therein, the system-general portion 330 of FIG. 3 therein, or a combination thereof.

Also for example, the history module 502 can determine the user history 302 based on receiving the user input 110 of FIG. 1 regarding controls or limitations for an amount or a degree for the guidance communication 120 of FIG. 1. The history module 502 can determine the user history 302 based on the user input 110 corresponding to or adjusting the one or more portions within the system route 324. Also for example, the history module 502 can determine the user history 302 based on the navigation route 204 of FIG. 2, the active-navigation portion 214 of FIG. 2 therein, the passive-navigation portion 216 of FIG. 2 therein, the general-navigation portion 218 of FIG. 3 therein, or a combination thereof confirmed by the system user 108.

The history module 502 can determine the user history 302 based on the navigation route 204 or location trace for representing locations previously visited by the system user 108. The navigation system 100 can determine the current location information, such as GPS coordinates or calendar event location, corresponding to the system user 108 using the location circuit 420 of FIG. 4, the first communication circuit 416 of FIG. 4, the second communication circuit 436 of FIG. 4, the first control circuit 412 of FIG. 4, the second control circuit 434 of FIG. 4, or a combination thereof.

The history module 502 can determine the user history 302 by storing the location information representing current location in the first storage circuit 414 of FIG. 4, the second storage circuit 446 of FIG. 4, or a combination thereof. The history module 502 can similarly store the system route 324 including one or more portions regarding various levels or degree of the guidance communication 120, store the navigation route 204 including one or more portions finalized or verified by the system user 108, or a combination thereof.

The current interaction module 508 can further process the user context 304 as discussed below. The history module 502 can determine the user history 302 by storing the user context 304 corresponding to the user current location.

After record and manage information regarding previous locations and movements, the control flow can pass from the history module 502 to the familiarity module 504. For example, the control flow can pass by having a processing result, such as the user history 302 or a portion thereof as an output from the history module 502 to an input of the familiarity module 504.

Also for example, the control flow can further pass by storing the processing result at a location known and accessible to the familiarity module 504. Also for example, the control flow can further pass by notifying the familiarity module 504, such as by using a flag, an interrupt, a status signal, or a combination thereof. Also for example, the control flow can further pass using a combination of the processes described above.

The familiarity module 504 is configured to estimate a familiarity or comfort level of the system user 108 for one or more geographic locations. The familiarity module 504 can estimate the familiarity or comfort level based on calculating the user familiarity estimate 308 of FIG. 3 for the one or more geographic locations. The familiarity module 504 can estimate the familiarity or comfort level based on generating the user geographic-knowledge model 306 of FIG. 3. The familiarity module 504 can estimate the familiarity or comfort level using a density module 510, a weight module 512, a distribution module 514, a knowledge module 516, or a combination thereof.

The density module 510 is configured to analyze a quantity, a duration, a frequency, or a combination thereof for visits or location of the system user 108 coinciding with one or more geographic locations. The density module 510 can analyze based on calculating the point density 310 of FIG. 3 for the one or more geographic locations. The density module 510 can calculate the point density 310 based on the user history 302 for representing concentration of locations previously visited by the system user 108.

The density module 510 can calculate the point density 310 based on the map 202 of FIG. 2. The density module 510 can use one or more unit areas or zones. The density module 510 can utilize the one or more unit areas or zones predetermined according to an estimated total capacity of vehicles, people, objects, or a combination thereof, one or more dimensions, a size or a surface area measurement, or a combination thereof.

The density module 510 can utilize the one or more unit areas or zones predetermined by the navigation system 100, such as included in the map 202. The density module 510 can further dynamically calculate or determine the one or more unit areas or zones. The density module 510 can dynamically calculate or determine the one or more unit areas or zones based on or along the system route 324 calculated by or other information from the current interaction module 508.

The density module 510 can calculate the point density 310 based on counting a number of occasions where the previous location of the system user 108 overlaps or coincides with the subject location including one or more instances of the unit areas or zones. The density module 510 can further calculate the point density 310 based on counting a number of occasions occurring relative to a specific time or period.

For example, the density module 510 can further calculate the point density 310 of the subject location or area based on a limited time period or duration, such as relative to a reference time in the past, relative to the current time for defining recent visits, a duration between visits, or a combination thereof. As a more specific example, the density module 510 can calculate the point density 310 based on a number of recent visits to the subject location or area according to a threshold time period starting from the current time.

Also as a more specific example, the density module 510 can calculate the point density 310 based on a number of visits during a specific prior time period processed by the navigation system 100. Also as a more specific example, the density module 510 can calculate the point density 310 based on a number of visits associated with frequency or an elapsed time between visits satisfying a predetermined frequency or time threshold.

Also as a more specific example, the density module 510 can calculate the point density 310 based on a number of visits corresponding to a common instance or a related sequence of the user context 304 or a contextual parameter. Also as a more specific example, the density module 510 can calculate the point density 310 based on a combination of qualifications or processes exemplified above.

The weight module 512 is configured to calculate a measure or an indication associated with controlling an amount or a degree of the guidance communication 120 necessary for the system user 108 for one or more geographic locations. The weight module 512 can calculate the measure or the indication based on calculating the guidance weight 312 of FIG. 3. The weight module 512 can calculate the guidance weight 312 based on the passive-navigation portion 216, the general-navigation portion 218, the active-navigation portion 214, or a combination thereof according to the user history 302.

The weight module 512 can calculate the guidance weight 312 for the subject location including one or more instances of the unit areas or zones. The weight module 512 can calculate the guidance weight 312 for the unit areas or zones predetermined by the navigation system 100 or dynamically based on the current interaction module 508 as discussed above.

The weight module 512 can calculate the guidance weight 312 based on the passive-navigation portion 216, the general-navigation portion 218, the active-navigation portion 214, or a combination thereof previously confirmed or utilized by the system user 108 in traversing through the subject location. For example, the weight module 512 can calculate the guidance weight 312 based on a number of occurrences for the active-navigation portion 214, the passive-navigation portion 216, the general-navigation portion 218, or a combination thereof occurring at or coinciding with the subject location in the past according to the user history 302.

Also for example, the weight module 512 can calculate the guidance weight 312 based on the recent time period determined by a delay threshold, the specific prior time period, the frequency or elapsed time, the user context 304, or a combination thereof similar to the density module 510 as exemplified above. The weight module 512 can calculate the guidance weight 312 based on a level or a degree of guidance previously utilized by the system user 108 for the subject area, corresponding to the occurrence or usage of the passive-navigation portion 216, the general-navigation portion 218, the active-navigation portion 214, or a combination thereof, instead of an occurrence of the visit processed in the density module 510 for the point density 310.

As a more specific example, the weight module 512 can calculate the guidance weight 312 using a unique score associated with each unique level or degree of the previously utilized guidance. The weight module 512 can calculate the guidance weight 312 based on further processing the unique score according to a number of occurrences, a time associated thereto, an elapsed time or frequency between occurrences, the contextual influence, or a combination thereof. The weight module 512 can utilize the unique score along with an equation or a process predetermined by the navigation system 100 to calculate the guidance weight 312 based on the previous occurrences or usage of the level or degree of the previously utilized guidance.

The distribution module 514 is configured to determine the familiarity distribution function 314 of FIG. 3. The distribution module 514 can determine the familiarity distribution function 314 for representing a relationship between a location previously visited by the system user 108 and a further location not previously visited by the system user 108.

The distribution module 514 can determine the familiarity distribution function 314 based on features or characteristics in the map 202. For example, the distribution module 514 can determine the familiarity distribution function 314 based on the path irregularity 316 of FIG. 3, as a function of the locations-correlation measure 318 of FIG. 3, or a combination thereof.

The distribution module 514 can determine the path irregularity 316 based on analyzing the map 202. The distribution module 514 can further analyze the map 202 dynamically based on the system route 324 or other information from the current interaction module 508. The distribution module 514 can determine the path irregularity 316 based on measuring angles or comparing multiple points along paths included in the map 202. The distribution module 514 can analyze the map 202 based on iterating through the unit areas of the map 202.

The distribution module 514 can determine the path irregularity 316 when the analyzed continuous path includes an angle or a shape satisfying a predetermined threshold or template. The distribution module 514 can determine the path irregularity 316 based on accessing the path irregularity 316 predetermined by the navigation system 100.

The distribution module 514 can determine the familiarity distribution function 314 based on or representing the locations-correlation measure 318 between a known or previously visited location and an unknown or never visited location for the system user 108. The distribution module 514 can determine the familiarity distribution function 314 based on selecting or generating a function or an equation for calculating the user familiarity estimate 308 for the system user 108 regarding a location not included in the user history 302.

For example, the distribution module 514 can select the familiarity distribution function 314 for the subject location including one or more instances of the unit areas or zones. The distribution module 514 can select the familiarity distribution function 314 from a set of functions or equations predetermined by the navigation system 100. Also for example, the distribution module 514 can generate the familiarity distribution function 314 by formulating or creating an equation or a process for a geographic location or area based on rules, conditions, scenarios, or a combination thereof predetermined by the navigation system 100.

Also for example, the distribution module 514 can generate the familiarity distribution function 314 by combining the locations-correlation measure 318 between the previously-visited location and a never visited location corresponding to various measures. The distribution module 514 can calculate the locations-correlation measure 318 representing the two locations according to various factors or categories, such as the path irregularity 316, a distance between the locations, a common characteristic, such as for path names or zoning, or a combination thereof.

The distribution module 514 can determine the familiarity distribution function 314 based on a variety of inputs or factors. The distribution module 514 can determine the familiarity distribution function 314 associated with the path irregularity 316, the locations-correlation measure 318, or a combination thereof along with distance, existence of common characteristics including names, types, or zoning information, or a combination thereof.

The knowledge module 516 is configured to estimate the familiarity or comfort level of the system user 108 for navigating through a geographic location or area. The knowledge module 516 can estimate by generating the user geographic-knowledge model 306. The knowledge module 516 can generate the user geographic-knowledge model 306 based on calculating the user familiarity estimate 308 for one or more locations.

The knowledge module 516 can calculate the user familiarity estimate 308 for one or more locations previously visited or traversed by the system user 108. The knowledge module 516 can calculate the user familiarity estimate 308 for the previously visited or traversed locations based on the point density 310, the guidance weight 312, or a combination thereof.

For example, the knowledge module 516 can calculate the user familiarity estimate 308 to represent the system user 108 being familiar with geography of the subject location or area when the point density 310 describes the system user 108 to have visited the subject location or area over a threshold number of times, within a threshold time or frequency, or a combination thereof. Also for example, the knowledge module 516 can calculate the user familiarity estimate 308 to represent the system user 108 being very familiar with the geography of the subject location or area when guidance weight 312 describes the system user 108 for the passive-navigation portion 216.

The knowledge module 516 can calculate the user familiarity estimate 308 for one or more locations that have not been visited or traversed by the system user 108. The knowledge module 516 can calculate the user familiarity estimate 308 for such locations using the familiarity distribution function 314 corresponding to or specific for the specific and relevant instance of the location that have not been visited or traversed by the system user 108.

The knowledge module 516 can calculate the user familiarity estimate 308 for such locations based on one or more instances of the locations-correlation measure 318 as represented by or included in the familiarity distribution function 314. For example, the knowledge module 516 can calculate the user familiarity estimate 308 using the familiarity distribution function 314 by extrapolating the user familiarity estimate 308 from the relevant previously visited location to the location not visited by the system user 108.

As a more specific example, the knowledge module 516 can calculate or extrapolate the user familiarity estimate 308 to be relatively high for the location not previously visited by the system user 108 but having a line-of-sight to another location previously visited or known to the system user 108. Also as more specific example, the knowledge module 516 can calculate or extrapolate the user familiarity estimate 308 to become less familiar as a distance between the previously visited or known location and the location not previously visited by the system user 108 increases.

Also as more specific example, the knowledge module 516 can calculate or extrapolate the user familiarity estimate 308 to be higher when the two locations share the same name. Also as more specific example, the knowledge module 516 can calculate or extrapolate the user familiarity estimate 308 to be higher when the two locations are along the path with same name or characteristic, but lower when the path includes the path irregularity 316 between the two points.

The knowledge module 516 can generate the user geographic-knowledge model 306 based on aggregating or combining the instances of the user familiarity estimate 308 for various geographic locations. The knowledge module 516 can further dynamically generate the user geographic-knowledge model 306 in response to and specific to the system route 324 or other information from the current interaction module 508. The knowledge module 516 can dynamically generate the user geographic-knowledge model 306 for representing an estimate of a familiarity of the system user 108 for a geographic area.

The knowledge module 516 can generate the user geographic-knowledge model 306 based on the point density 310, the guidance weight 312, the user familiarity estimate 308, the familiarity distribution function 314, or a combination thereof. The knowledge module 516 can generate the user geographic-knowledge model 306 from the user familiarity estimate 308 calculated based on the point density 310, the guidance weight 312, the familiarity distribution function 314, or a combination thereof as discussed above.

The knowledge module 516 can alternately generate the user geographic-knowledge model 306 using a machine-learning mechanism or a pattern recognition mechanism utilizing various different information discussed above as input. The knowledge module 516 can use the machine-learning mechanism or the pattern recognition mechanism to process clusters or the point density 310, weights or the guidance weight 312, the user familiarity estimate 308, the familiarity distribution function 314, or a combination thereof to generate the user geographic-knowledge model 306.

It has been discovered that the user geographic-knowledge model 306 or the user familiarity estimate 308 based on the familiarity distribution function 314 provides increased usability and reduction in resources for providing navigation assistance. The familiarity distribution function 314 can extrapolate the user familiarity estimate 308 for locations never visited by the system user 108 but having logical connection to other locations that the user has visited. The extrapolation for familiarity or comfort level can reduce the amount of guidance necessary for the system user 108 in traversing through some of the never-visited locations. The reduction in guidance can remove unwanted distractions or interruptions for the user. The reduction in guidance can further reduce the amount of communicated and stored guidance data as well as the energy required to communicate the data.

The knowledge module 516 can further generate the user geographic-knowledge model 306 based on the user input 110 regarding the navigation route 204 or for controlling the amount or degree of the guidance communication 120. The knowledge module 516 can generate the user geographic-knowledge model 306 based on the user input 110 corresponding to the passive-navigation portion 216, the general-navigation portion 218, or a combination thereof. The user input 110 can be represented by the guidance weight 312 as discussed above.

It has been discovered that the user geographic-knowledge model 306 or the user familiarity estimate 308 based on the guidance weight 312 reflecting the user input 110 for controlling the amount or degree of the guidance communication 120 provides increased accuracy in reflecting the familiarity or comfort level of the system user 108. The navigation system 100 can directly utilize information from the system user 108 and transform it to the user geographic-knowledge model 306 or the user familiarity estimate 308 for multiple locations. The user input 110 for controlling the amount or degree of the guidance communication 120 can be directly incorporated as user's feedback, usage, or verification for the user's geographic knowledge or comfort level to increase the accuracy.

The familiarity module 504 can estimate the familiarity or comfort level of the system user 108, including the processing for the point density 310, the guidance weight 312, the familiarity distribution function 314, the user familiarity estimate 308, the user geographic-knowledge model 306, or a combination thereof using the first control circuit 412, the second control circuit 434, the first communication circuit 416, the second communication circuit 436, the location circuit 420, or a combination thereof. The familiarity module 504 can store the point density 310, the guidance weight 312, the familiarity distribution function 314, the user familiarity estimate 308, the user geographic-knowledge model 306, or a combination thereof in the first storage circuit 414, the second storage circuit 446, or a combination thereof.

After estimating the familiarity or comfort level of the system user 108 for various geographic locations, the control flow can pass from the familiarity module 504 to the pattern module 506. The control flow can pass in a manner similar to the manner described above between the history module 502 and the familiarity module 504, but using the processing results of the familiarity module 504, such as the user geographic-knowledge model 306, the user familiarity estimate 308, a portion thereof, other processing results, or a combination thereof.

The pattern module 506 is configured to determine patterns of the system user 108 associated with geographic movements. The pattern module 506 can determine the patterns of movement for the system user 108. For example, the pattern module 506 can calculate the user driving pattern 320 of FIG. 3. Also for example, the pattern module 506 can determine the patterns in the user context 304 and the user travel or movement. Also for example, the pattern module 506 can determine the patterns in the user input 110 for controlling or adjusting the amount or degree of the guidance communication 120.

The pattern module 506 can use a separate machine-learning or pattern recognition mechanism to determine the patterns. For example, the pattern module 506 can access the user history 302 and utilize the user history 302 as input for the separate machine-learning or pattern recognition mechanism. As a more specific example, the pattern module 506 can analyze the user history 302 to determine a common travel time, a common destination, a common context, a preferred path or type of route, or a combination thereof specific for the system user 108.

The pattern module 506 can use one or more control circuits to determine the patterns. The pattern module 506 can further use one or more communication circuits, one or more interfaces, or a combination thereof to access the user history 302. The pattern module 506 can further use one or more communication circuits, one or more interfaces, one or more storage circuits, or a combination thereof to store the determined patterns.

The current interaction module 508 is configured to interact with the system user 108 and communicate various information in real-time with the system user 108. The current interaction module 508 can receive information, command, control, or a combination thereof from the system user 108 for the navigation system 100. The current interaction module 508 can further transmit, provide, display, generate sound or haptic feedback, or a combination thereof from the navigation system 100 for the system user 108.

The current interaction module 508 can communicate to the system user 108 through the first device 102 of FIG. 1. The current interaction module 508 can further communicate information between the system user 108 and the second device 106 of FIG. 1 through or using the first device 102. The current interaction module 508 can include a current state module 518, a route calculation module 520, an update module 522, a guidance module 526, or a combination thereof for interacting and communicating with the system user 108.

The current state module 518 is configured to determine current conditions corresponding to the map 202. The current state module 518 can determine the current conditions including traffic flows, accidents or obstacles, road conditions, weather, or a combination thereof.

The current state module 518 can determine the current conditions based on user-provided information across multiple users or user devices according to a crowd-sourcing mechanism. The current state module 518 can further determine the current conditions based on accessing a record, a data base, or a service provider, such as for current weather, historical traffic information, current traffic flow rate, reported road conditions, accident or obstacle reports, or a combination thereof.

The current state module 518 can further compare the current conditions to the user driving pattern 320. For example, the current state module 518 can check for the current conditions along routes or paths associated with the user driving pattern 320. The current state module 518 can generate flags or indications when the current conditions along routes or paths associated with the user driving pattern 320 match predetermined conditions, such as specific weather pattern, delay rate, accident, or a combination thereof.

The route calculation module 520 is configured to calculate, generate, or a combination thereof for navigating the system user 108 to the destination 208. The route calculation module 520 can calculate the system route 324. The route calculation module 520 can calculate the system route 324 including the system-active portion 326, the system-passive portion 328, the system-general portion 330, the parking lookout zone 334 of FIG. 3, the automatic drive portion 338 of FIG. 3, the user-maneuver portion 340 of FIG. 3, or a combination thereof.

The route calculation module 520 can use the first user interface 418 of FIG. 4, the first communication circuit 416, the second communication circuit 436, or a combination thereof to interact with the system user 108. For example, the route calculation module 520 can interact with the system user 108 including receiving a navigation request, the destination 208, the starting point 206 of FIG. 2, or a combination thereof from the system user 108.

The route calculation module 520 can further use one or more communication circuits, one or more control circuits, one or more internal interfaces, or a combination thereof to determine the destination 208, the starting point 206, or a combination thereof. For example, the route calculation module 520 can determine the destination 208, the starting point 206, or a combination thereof based on the user's calendar schedule, the user driving pattern 320, or a combination thereof.

As a more specific example, the route calculation module 520 can determine the goal-cost difference 322 of FIG. 3 for comparing the system route 324 with the user driving pattern 320. The route calculation module 520 can determine the goal-cost difference 322 based on the current condition along the user driving pattern 320. The route calculation module 520 can calculate one or more routes to the destination 208 corresponding to the user driving pattern 320.

Continuing with the example, the route calculation module 520 can determine the goal-cost difference 322 based on comparing a resource or cost, such as travel time, effort, fuel, or a combination thereof, for the route associated with the user driving pattern 320 and calculated alternate routes. The route calculation module 520 can determine the goal-cost difference 322 for notifying the system user 108 of abnormalities or excessive expenditure in the resource or cost for the user driving pattern 320. Details for further processing of the goal-cost difference 322 are discussed below.

The route calculation module 520 can calculate the system route 324 generated by the navigation system 100 for navigating or assisting the system user 108 from traversing from the starting point 206 to the destination 208. For example, the route calculation module 520 can calculate the system route 324 based on a tree traversal mechanism, a graph traversal mechanism, or a combination thereof. As a more specific example, the route calculation module 520 can use an A* algorithm, a Bellman-Ford algorithm, a bidirectional algorithm, a Dijkstra's algorithm, a Floyd-Warshall algorithm, an iterative deepening algorithm, a shortest path algorithm, or a combination thereof to calculate the system route 324.

The route calculation module 520 can further calculate the system route 324 including one or more portions with controls or limits for an amount or degree of the guidance communication 120 based on the user geographic-knowledge model 306, the user familiarity estimate 308, or a combination thereof. The route calculation module 520 can calculate the system route 324 including the one or more portions, such as the system-active portion 326, the system-passive portion 328, the system-general portion 330, or a combination thereof, corresponding to the user familiarity estimate 308 of the locations or areas included in the system route 324.

For example, the route calculation module 520 can calculate the system route 324 including the one or more portions based on the navigation route 204 previously utilized or confirmed by the system user 108. The route calculation module 520 can calculate the system route 324 to include the one or more portions corresponding to the amount or degree of detail or instruction identical to or less than the last utilized or confirmed amount or degree of detail or instruction.

As a more specific example, the route calculation module 520 can calculate the system route 324 including the system-passive portion 328, the system-general portion 330, or a combination thereof based on the navigation route 204 and the user geographic-knowledge model 306 for controlling the guidance communication 120 for the system route 324 based on the navigation route 204 previously utilized by the system user 108. The route calculation module 520 can calculate the system route 324 to include the one or more portions therein identical to the navigation route 204 last utilized or confirmed for the same corresponding location or area.

Continuing with the more specific example, the route calculation module 520 can calculate the system route 324 to include the one or more portions corresponding to the amount or degree of detail or instruction identical to or less than the last utilized or confirmed instance of the navigation route 204 based on a time delay between the system route 324 and the navigation route 204. The route calculation module 520 can maintain the portion and the level of guidance when the time delay is within a range.

Also continuing with the more specific example, the route calculation module 520 can calculate the system route 324 to include the one or more portions corresponding to the amount or degree of detail or instruction based on a number of occasions or instances of the navigation route 204, their corresponding level of degree of detail or instruction, or a combination thereof. The route calculation module 520 can further decrease the level of guidance when the time delay is below a threshold, when multiple occasions or instances of the navigation route 204 have been utilized within a time period or more frequent than a threshold, or a combination thereof.

Also for example, the route calculation module 520 can calculate the system route 324 including one or more portions corresponding to the amount or degree of detail or instruction based on the user familiarity estimate 308 corresponding to the geographic location or area. The route calculation module 520 can include a range of threshold values for the user familiarity estimate 308 for each of the system-active portion 326, the system-passive portion 328, and the system-general portion 330. The route calculation module 520 can calculate the system route 324 to include the one or more portions corresponding to the user familiarity estimate 308 matching the range of threshold values.

The route calculation module 520 can calculate the system route 324 including one or more portions, such as the system-active portion 326, the system-passive portion 328, the system-general portion 330, the parking lookout zone 334, the automatic drive portion 338, the user-maneuver portion 340, or a combination thereof based on determining a starting location or condition, an ending location or condition, or a combination thereof for one or more of the portions. For example, the route calculation module 520 can calculate the system route 324 including a location or coordinate, an area, or a combination thereof on the system route 324 corresponding to a specific amount or degree of the guidance communication 120. The route calculation module 520 can calculate the system route 324 including the guidance-start location 220 of FIG. 2, the guidance-end location 222 of FIG. 2, or a combination thereof.

Also for example, the route calculation module 520 can further calculate the system route 324 to include one or more locations, coordinates, or areas along the system route 324 corresponding to a level, a flag, a value, or a combination thereof matching the specific portion corresponding to the amount or degree of the guidance communication 120. The navigation system 100 can interact with the system user 108 to verify the portions and the specific amount or degree of the guidance communication 120. The navigation system 100 can further determine and generate and communicate the actual instances of the guidance communication 120 corresponding to the system route 324 and the one or more portions therein. Details regarding the interaction and the guidance communication 120 are discussed below.

The route calculation module 520 can further calculate the system route 324 including the system-general portion 330 based on the goal-cost difference 322 relative to the user driving pattern 320. The route calculation module 520 can calculate the system route 324 to include the system-general portion 330 to notify of the system user 108 based on the goal-cost difference 322 for deviating from the user driving pattern 320. The route calculation module 520 can calculate the system route 324 to include the system-general portion 330 based on assuming the system user 108 would be familiar with the geographic area to utilize the system route 324 without the detailed guidance 212 of FIG. 2. The route calculation module 520 can further calculate the system route 324 to include a different level or degree of the guidance communication 120 corresponding to the user familiarity estimate 308.

The route calculation module 520 can further calculate the system route 324 for further controlling the hardware status 230 of FIG. 2 corresponding to the amount or degree of detail or instruction. For example, the route calculation module 520 can calculate the system route 324 for controlling the location circuit 420, the first user interface 418, the second user interface 438, the first communication circuit 416, the second communication circuit 436, the first control circuit 412, the second control circuit 434, or a combination thereof.

As a more specific example, the route calculation module 520 can calculate the system route 324 for controlling a refresh rate, a communication or processing capacity, a brightness, an on or off status, a computational or a memory resource allowance, or a combination thereof. The route calculation module 520 can calculate the system route 324 for controlling the screen display status 232 of FIG. 2, the audible guidance status 234 of FIG. 2, the locating function status 236 of FIG. 2, or a combination thereof. Details regarding the control of the hardware status 230 are discussed below.

The route calculation module 520 can determine the parking lookout zone 334. The route calculation module 520 can determine the parking lookout zone 334 based on real-time information provided by facilities or entities providing or managing the parking resources, such as the city, the parking structure or lot, or a combination thereof. The route calculation module 520 can further determine the parking lookout zone 334 based on real-time information provided by other users, such as through the crowd-sourcing mechanism.

The route calculation module 520 can determine the parking lookout zone 334 to indicate or represent the available parking structure as indicated by the received information. The route calculation module 520 can further determine the parking lookout zone 334 to be a threshold distance away from the destination 208 or from the area or location without any available resources. The route calculation module 520 further determine the parking lookout zone 334 as the location or area with the destination density measure 336 of FIG. 3 matching or falling below a density threshold predetermined by the navigation system 100.

The route calculation module 520 can further calculate the destination density measure 336. The route calculation module 520 can calculate the destination density measure 336 based on real-time feedback or location information from multiple users through the crowd-sourcing mechanism. The route calculation module 520 can further calculate the destination density measure 336 based on historical models or past records, events or other contextual information associated with the destination 208 or within a threshold distance thereof, or a combination thereof.

The route calculation module 520 can determine the automatic drive portion 338, the user-maneuver portion 340, or a combination thereof similarly as the portions associated with the degree or amount of the guidance communication 120. For example, the route calculation module 520 can determine the automatic drive portion 338, the user-maneuver portion 340, or a combination thereof for the system route 324 based on previous usage thereof. Also for example, the route calculation module 520 can determine the automatic drive portion 338, the user-maneuver portion 340, or a combination thereof based on the user geographic-knowledge model 306, the user familiarity estimate 308, the destination density measure 336, the path irregularity 316, or a combination thereof.

It has been discovered that the system route 324 including one or more portions for controlling or limiting the amount or degree of the guidance communication 120 based on the user geographic-knowledge model 306 or the user familiarity estimate 308 provides improved usability and reduced energy consumption. The navigation system 100 can process the user geographic-knowledge model 306 or the user familiarity estimate 308 directly from the user history 302 including locations previously visited by the system user 108, the user input 110 directly controlling the amount or degree of the guidance communication 120, or a combination thereof. The navigation system 100 can further extrapolate the user familiarity estimate 308 for other locations not previously visited but correlated to the visited areas.

The navigation system 100 can control and reduce the amount or degree of the guidance communication 120 for areas determined to be familiar to the system user 108 to remove unnecessary communications, which can be perceived as distractions or annoyance by the system user 108. Further, the reduction of the amount or degree of the guidance communication 120 can reduce the amount of information stored on a device or communicated between devices. Further the reduction of the amount or degree of the guidance communication 120 can be used to reduce unnecessary hardware operations or functionalities, thereby reducing the energy consumption.

The update module 522 is configured to interact with the system user 108 regarding the system route 324. The update module 522 can interact with the system user 108 to communicate the system route 324 to the system user 108, receive the user input 110 regarding the system route 324, or a combination thereof.

The update module 522 can communicate the system route 324, along with specific information or description regarding one or more of the portions therein, for guiding the system user 108 in traversing the system route 324. The update module 522 can communicate the system route 324 to the system user 108, and also between devices.

The update module 522 can communicate the system route 324 to the system user 108 by displaying or by generating audible sounds for the system route 324, information or description thereof, or a combination thereof. The update module 522 can use one or more of the user interfaces, one or more of the communication circuits, one or more of the control circuits, or a combination thereof to communicate the system route 324 to the system user 108. The update module 522 can communicate the system route 324 through the first device 102 and the first user interface 418 therein.

The update module 522 can receive the user input 110 from the system user 108 in a similar manner. The update module 522 can receive the user input 110 adjusting the one or more portions in the system route 324 for controlling the amount or degree of the guidance communication 120 along the system route 324. For example, the update module 522 can receive the user input 110 corresponding to the passive-navigation portion 216 for representing one or more locations of the system route 324 not requiring communication of the guidance communication 120 for the system user 108, the general-navigation portion 218 for representing one or more further locations of the system route 324 reducing the communication of the guidance communication 120, or a combination thereof.

The update module 522 can receive the verbal input 112 of FIG. 1, the action input 114 of FIG. 1, the tactile input 116 of FIG. 1, or a combination thereof verifying or adjusting the system route 324, verifying or adjusting one or more portions therein, or a combination thereof. For example, the update module 522 can receive stimulus from the system user 108 including verbal confirmation, a motion command, a pressing of a button or a corresponding location on a touch screen, or a combination thereof.

Also for example, the update module 522 can receive stimulus from the system user 108 including displacement or location information from the location circuit 420 verifying the system user 108 following the system route 324. Also for example, the update module 522 can receive stimulus from the system user 108 including adding, deleting, dragging, or a combination thereof for one or more of the portions corresponding to a specific amount or degree of the guidance communication 120, the starting point or the ending point thereof on the system route 324, the guidance-start location 220, the guidance-end location 222, or a combination thereof.

The update module 522 can receive the user input 110 through the first device 102 and the first user interface 418 therein. The update module 522 can further receive, communicate, and process the user input 110 using one or more of the user interfaces, one or more of the communication circuits, one or more of the control circuits, or a combination thereof.

The update module 522 can further communicate the goal-cost difference 322, the system route 324 or the intermediate goal 210 of FIG. 2 as an alternative to the user driving pattern 320, or a combination thereof. The update module 522 can communicate, such as between devices, between the first device 102 and the system user 108, or a combination thereof, similarly as for communicating the system route 324.

The update module 522 can calculate the navigation route 204 based on verifying or adjusting the system route 324. The update module 522 can calculate the navigation route 204 by setting the system route 324, including any adjustments thereto corresponding to the user input 110, based on verification from the system user 108.

The trigger module 524 is configured to determine implementations for the navigation route 204. The trigger module 524 can determine the implementations for the guidance communication 120 specifically for guiding the system user 108 along the navigation route 204. The trigger module 524 can determine the implementations based on calculating the trigger mechanism 224 of FIG. 2, generating the guidance communication 120 specifically corresponding to the portion of the navigation route 204, or a combination thereof.

The trigger module 524 can generate the guidance communication 120 for the active-navigation portion 214, the general-navigation portion 218, or a combination thereof. The trigger module 524 can generate the guidance communication 120 including the intermediate goal 210, the detailed guidance 212, or a combination thereof.

The trigger module 524 can generate the guidance communication 120 including the intermediate goal 210, the detailed guidance 212, or a combination thereof for the active-navigation portion 214. The trigger module 524 can generate the guidance communication 120 including the intermediate goal 210 for the general-navigation portion 218. The trigger module 524 can abstain or not generate any instance of the guidance communication 120 for the passive-navigation portion 216.

The trigger module 524 can determine one or more instances of the intermediate goal 210 along the navigation route 204. The trigger module 524 can determine the intermediate goal 210 based on a distance or a duration associated with travel on a continuous segment or a segment with common name or type. The trigger module 524 can further determine the intermediate goal 210 based on a type or category of the segment.

For example, the trigger module 524 can determine the intermediate goal 210 as to get to or to travel along the segment exceeding a percentage of the length or the time duration along the system route 324, exceeding a length or time threshold, or a combination thereof. Also for example, the trigger module 524 can determine the intermediate goal 210 for reaching or traveling along freeways, highways, expressways, segments with number of lanes exceeding a predetermined threshold, or a combination thereof.

Also for example, the trigger module 524 can generate the detailed guidance 212 for the navigation route 204. The trigger module 524 can further generate the detailed guidance 212 associated with or for achieving the intermediate goal 210. The trigger module 524 can generate the detailed guidance 212 including specific maneuver, specific distances, specific landmarks, relative locations, path or node names, or a combination thereof.

The trigger module 524 can calculate the trigger mechanism 224 for including controlling the hardware status 230 of the first device 102, the second device 106, or a combination thereof. The trigger module 524 can calculate the trigger mechanism 224 for guiding the system user 108 to traverse the system route 324. The trigger module 524 can calculate the trigger mechanism 224 including the buffer location 226 of FIG. 2, the buffer time 228 of FIG. 2, or a combination thereof.

The trigger module 524 can calculate the trigger mechanism 224 for further controlling the hardware status 230 corresponding to the amount or degree of detail or instruction. For example, the trigger module 524 can calculate the trigger mechanism 224 for controlling the location circuit 420, the first user interface 418, the second user interface 438, the first communication circuit 416, the second communication circuit 436, the first control circuit 412, the second control circuit 434, or a combination thereof.

As a more specific example, the trigger module 524 can calculate the trigger mechanism 224 for controlling a refresh rate, a communication or processing capacity, a brightness, an on or off status, a computational or a memory resource allowance, or a combination thereof. The trigger module 524 can calculate the trigger mechanism 224 including the buffer time 228 based on estimated time of arrival at the buffer location 226 preceding a change in portions or amount or degree of guidance communication 120, a location preceding the buffer location 226 or the change in portions, or a combination thereof. The trigger module 524 can calculate the trigger mechanism 224 including the buffer location 226 preceding a change in portions or amount or degree of guidance communication 120.

As an illustrative example, the trigger module 524 can calculate the trigger mechanism 224 including the buffer location 226, the buffer time 228, or a combination thereof at an ending portion of the passive-navigation portion 216, the general-navigation portion 218, or a combination thereof before a different portion begins. The trigger module 524 can include indications or controls for turning off or downgrading the locating function status 236 controlling the location circuit 420, the first communication circuit 416, the second communication circuit 436, or a combination thereof during travel through the passive-navigation portion 216, the general-navigation portion 218, or a combination thereof.

Continuing with the example, the trigger module 524 can include indications or controls for turning off or downgrading the audible guidance status 234, the screen display status 232, or a combination thereof controlling the first user interface 418, the second user interface 438, or a combination thereof during travel through the passive-navigation portion 216, the general-navigation portion 218, or a combination thereof. The navigation system 100 can further down grade the hardware status 230, such as for lower refresh rate, lower communication or processing capacity, lower brightness, lower computational or memory resource allowance, or a combination thereof during travel through the passive-navigation portion 216, the general-navigation portion 218, or a combination thereof.

Continuing with the example, the trigger module 524 can calculate the trigger mechanism 224 including the buffer location 226, the buffer time 228, or a combination thereof to wake up the hardware or change the hardware status 230 to ensure a location verification. The trigger module 524 can calculate the buffer time 228 as a duration for sleeping, turning off, or downgrading the hardware. The trigger module 524 can similarly calculate the buffer location 226 as the geographic location for upgrading or turning on the hardware.

Continuing with the example, the trigger module 524 can calculate the buffer time 228 based on an estimated arrival time to the buffer location 226, a location preceding the buffer location 226, a location changing between portions or amount or degree of the guidance communication 120, a location preceding such change, or a combination thereof. The trigger module 524 can similarly calculate the buffer location 226 as the geographic location preceding the location changing between portions or amount or degree of the guidance communication. The trigger module 524 can calculate the buffer location 226 based on a threshold distance, percentage, or a combination thereof.

It has been discovered that the navigation route 204 including the trigger mechanism 224 provides increased usability and reduction in resource consumption. The trigger mechanism 224 can be used to reduce unnecessary communications of the guidance communication 120. The trigger mechanism 224 can further turn of unnecessary hardware functionalities, such as turning off or reducing refresh rate for the location unit 420, one or more of the communication systems, displays, or a combination thereof. The trigger mechanism 224 turning off or reducing the hardware functionalities can reduce the resources consumed by the corresponding functionalities.

The guidance module 526 is configured to implement the guidance for the navigation route 204. The guidance module 526 can guide the system user 108 to traverse the navigation route 204. The guidance module 526 can guide the system user 108 based on communicating the guidance communication 120, controlling the devices according to the hardware status 230, or a combination thereof.

The guidance module 526 can communicate the guidance communication 120 between devices, such as the first device 102, the second device 106, or a combination thereof. The guidance module 526 can combine or package the instances of the guidance communication 120 corresponding to the navigation route 204 to generate the guidance set 118 of FIG. 1. The guidance module 526 can communicate the guidance set 118 or individual instances of the guidance communication 120 between the devices of the navigation system 100.

As a more specific example, the guidance module 526 can generate the navigation route 204, the guidance communication 120, the guidance set 118, or a combination thereof at the second device 106. The guidance module 526 can include the second device 106 sending the navigation route 204, the guidance communication 120, the guidance set 118, or a combination thereof to the first device 102. The guidance communication 120, the guidance set 118, or a combination thereof can be sent as a text-based message to the first device 102.

The guidance module 526 can further communicate the guidance communication 120, the navigation route 204, or a combination thereof to the system user 108 for guiding or assisting the system user 108 in traversing the navigation route 204. For example, the guidance module 526 can communicate to the system user 108 by visually displaying, by creating audible sounds, or a combination thereof corresponding to the guidance communication 120, the navigation route 204, or a combination thereof. The guidance module 526 can use the first device 102 to communicate the guidance communication 120, the navigation route 204, or a combination thereof to the system user 108.

As a more specific example, the guidance module 526 can use one or more of the user interfaces to display the guidance communication 120, the navigation route 204, or a combination thereof on a display screen. Also as a more specific example, the guidance module 526 can use one or more of the control circuits to implement a text-to-speech processing for the text-based instances of the guidance communication 120. Also as a more specific example, the guidance module 526 can use one or more of the user interfaces to create the sounds corresponding to the guidance communication 120 through one or more speakers or sound generators.

The guidance module 526 can similarly communicate the parking lookout zone 334, instructions or notices for the automatic drive portion 338, the user-maneuver portion 340, or a combination thereof. For example, the guidance module 526 can alert the system user 108 to look for parking, provide the guidance communication 120 for traversing to the parking lot, or a combination thereof.

Also for example, the guidance module 526 can implement or initiate, or conversely end, automatic driving or driving assistance features. The guidance module 526 can further facilitate or initiate handover between automatic maneuvering controlled by the vehicle or the navigation system 100 and direct maneuvering by the system user 108.

The guidance module 526 can further implement the hardware controls corresponding to the portions with specific amount or degree of guidance. The guidance module 526 can implement or control the hardware status 230, such as for the screen display status 232, the audible guidance status 234, the locating function status 236, or a combination thereof.

For example, the guidance module 526 can control the screen display status 232 to be off, to be dimmer than normal active settings, or to hide information regarding the guidance communication 120, the navigation route 204, or a combination thereof for the passive-navigation portion 216, the general-navigation portion 218, or a combination thereof. Also for example, the guidance module 526 can control the locating function status 236 to be off, to be at a lower frequency or refresh rate, to suspend or halt the enhanced processing or any high energy consumption processing, or a combination thereof for the passive-navigation portion 216, the general-navigation portion 218, or a combination thereof. The guidance module 526 can update or manage the location circuit 420 according to controlling the locating function status 236.

Also for example, the guidance module 526 can process the guidance communication 120, such as for generating or communicating, to be absent, empty, or silent for the passive-navigation portion 216 to implement the audible guidance status 234. Also for example, the guidance module 526 can control the audible guidance status 234 to be quieter or muted for the passive-navigation portion 216 and comparatively louder for the active-navigation portion 214.

The guidance module 526 can further implement or control the hardware status 230 based on the trigger mechanism 224. For example, the guidance module 526 can suspend or downgrade the implementation of the hardware status 230 during or until the end of the buffer time 228. The guidance module 526 can perform a check, such as for the location, upgrade or restore the implementation of the hardware status 230, turn on various circuits or processes, or a combination thereof at the end of the buffer time 228.

Also for example, the guidance module 526 can suspend or downgrade the implementation of the hardware status 230 during or until the buffer location 226. The guidance module 526 can start verifying the current location of the system user 108 starting from the buffer location 226 to the destination 208, the location where the current instance of the navigation portion ends or another portion begins, the guidance-start location 220, the guidance-end location 222, or a combination thereof.

Also for example, the guidance module 526 can utilize both the buffer time 228 and the buffer location 226. As a more specific example, the guidance module 526 can turn one or more hardware or processes off during the buffer time 228. The guidance module 526 can then start low-level or coarse granularity processes or hardware after the buffer time 228 until the buffer location 226. The guidance module 526 can further turn on or upgrade one or more hardware or processes after the buffer location 226 to prepare or determine the destination 208, the location where the current instance of the navigation portion ends or another portion begins, or a combination thereof.

The guidance module 526 can compare the current location of the first device 102 associated with the system user 108 to the location associated with the trigger mechanism 224, start or end of one or more of the navigation portions within the navigation route 204, the guidance-start location 220, the guidance-end location 222, or a combination thereof. The guidance module 526 can communicate the guidance communication 120, control the hardware, or a combination thereof based on the current location matching or passing the specified locations.

It has been discovered that the navigation route 204 including the guidance set 118 limited and implemented with the trigger mechanism 224 provides increased usability and reduction in resource consumption. The trigger mechanism 224 can be used to implement checks or verifications to accurately implement the various navigation portions. Further, the guidance set 118 communicated between devices can be reduced in size or magnitude to save the resources. Further, the trigger mechanism 224 can be utilized to suspend or stop unnecessary processes or hardware functionalities, reducing overall power usage.

The current interaction module 508 can use one or more of the communication circuits, one or more of the user interfaces, one or more of the control circuits, or a combination thereof to communicate between devices or with the system user 108. The current interaction module 508 can further utilize one or more of the communication circuits, one or more of the control circuits, or a combination thereof to process the various information discussed above. The current interaction module 508 can store the processing results, such as the navigation route 204, the user input 110, the corresponding navigation portions, the trigger mechanism 224, the hardware status 230, or a combination thereof in one or more of the storage circuits.

The processing results of the current interaction module 508 can be passed back to the history module 502, the familiarity module 504, or a combination thereof. For example, the navigation route 204 confirmed by the system user 108, one or more navigation portions of the route controlling the amount or degree of the guidance communication 120, or a combination thereof can be passed to the history module 502. The history module 502 can update the user history 302 based on the navigation route 204, the one or more confirmed navigation portions, or a combination thereof from the current interaction module 508 as discussed above.

Also for example, the navigation route 204 confirmed by the system user 108 can be passed to the familiarity module 504. The familiarity module 504 can assess the user familiarity along the navigation route 204 based on the user geographic-knowledge model 306. The familiarity module 504 can further calculate the user familiarity estimate 308 specific to the navigation route 204. The current interaction module 508 and the trigger module 524 therein can further process the navigation route 204 according to the user familiarity estimate 308 to calculate and generate the various portions controlling the degree or amount of the guidance communication 120 in the navigation route 204.

The modules described in this application can be hardware implementation or hardware accelerators, including passive circuitry, active circuitry, or both, in the first storage circuit 414, the second storage circuit 446, the first control circuit 412, the second control circuit 434, or a combination thereof. The modules can also be hardware implementation or hardware accelerators, including passive circuitry, active circuitry, or both, within the first device 102, the second device 106, or a combination thereof but outside of the first storage circuit 414, the second storage circuit 446, the first control circuit 412, the second control circuit 434, or a combination thereof.

The navigation system 100 has been described with module functions or order as an example. The navigation system 100 can partition the modules differently or order the modules differently. For example, the current interaction module 508 can precede the history module 502 to initiate the overall process. Also for example, the history module 502 and the familiarity module 504 can be processed or implemented in parallel after the current interaction module 508. Also for example, the pattern module 506 can be included within the history module 502. Also for example, the update module 522 can be merged with the route calculation module 520, the trigger module 524, or a combination thereof.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 414, the second storage circuit 446, or a combination thereof can represent the non-transitory computer readable medium. The first storage circuit 414, the second storage circuit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the map 202 and the user input 110 in processing the user geographic-knowledge model 306 and the user familiarity estimate 308 results in the movement in the physical world, such as physical change in the navigation route 204 or the guidance communication 120 communicated through one or more of the devices or physical displacement of the system user 108 carrying the first device 102. Movement in the physical world results in updates to the user history 302, the hardware status 230, or a combination thereof, which can be fed back into the navigation system 100 and further influence or update the user geographic-knowledge model 306 and the user familiarity estimate 308.

Figure 6:
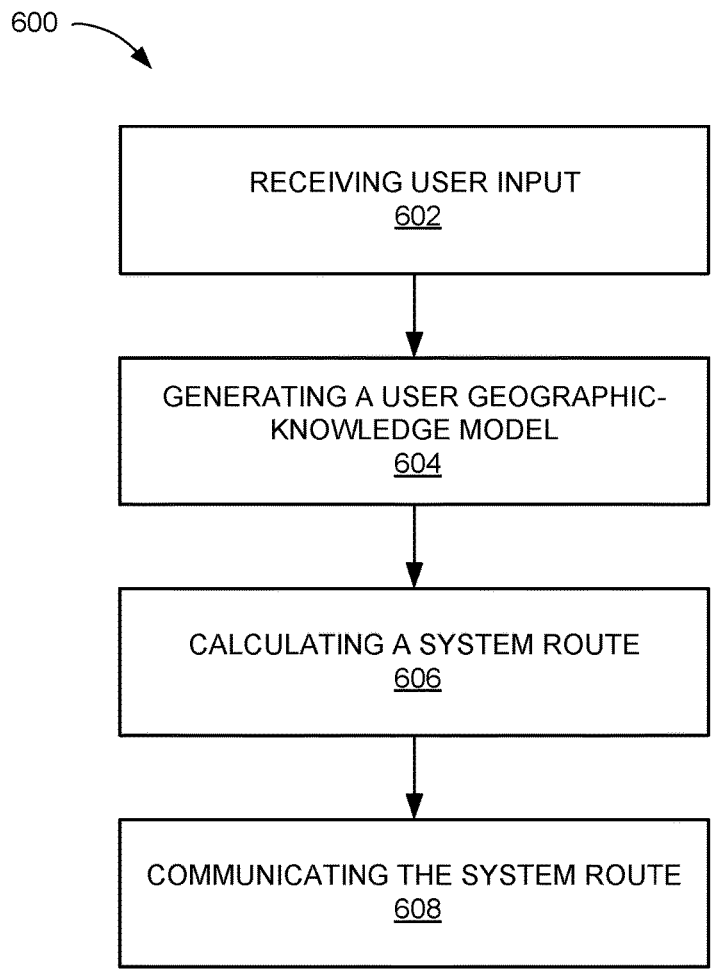
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: receiving user input regarding a navigation route for controlling guidance communication along the navigation route for a system user in a block 602; generating with a control circuit a user geographic-knowledge model based on the user input regarding the navigation route in a block 604; calculating a system route based on the user geographic-knowledge model in a block 606; and communicating the system route for guiding the system user in traversing the system route in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   receiving user input regarding a navigation route for controlling guidance communication along the navigation route for a system user wherein the user input corresponds to a passive-navigation portion for representing one or more locations of the navigation route not requiring communication of the guidance communication for the system user;
   generating with a control circuit a user geographic-knowledge model based on the user input regarding the navigation route;
   calculating a system route based on the user geographic-knowledge model; and
   communicating the system route for guiding the system user in traversing the system route.

2. The method as claimed in claim 1 further comprising:
   determining a user history based on the navigation route for representing locations previously visited by the system user;
   calculating a point density based on the user history for representing concentration of locations previously visited by the system user; and
   wherein:
   generating the user geographic-knowledge model includes generating the user geographic-knowledge model based on the point density for estimating a familiarity of the system user for a geographic area.

3. The method as claimed in claim 1 further comprising:
   determining a user history based on the navigation route including the passive-navigation portion, a general-navigation portion, or a combination thereof for limiting the guidance communication for one or more locations of the navigation route previously utilized the system user;
   calculating a guidance weight based on the passive-navigation portion, the general-navigation portion, or a combination thereof according to the user history; and
   wherein:
   generating the user geographic-knowledge model includes generating the user geographic-knowledge model based on the guidance weight.

4. The method as claimed in claim 1 further comprising:
determining a user history based on the navigation route for representing locations previously visited by the system user;
determining a familiarity distribution function associated with the user history for calculating a user familiarity estimate for the system user regarding a location not included in the user history; and
wherein:
generating the user geographic-knowledge model includes generating the user geographic-knowledge model based on the user familiarity estimate and the familiarity distribution function.

5. The method as claimed in claim 1 wherein:
receiving the user input includes receiving the user input corresponding to a general-navigation portion for representing one or more further locations of the navigation route reducing the communication of the guidance communication; and
generating the user geographic-knowledge model includes generating the user geographic-knowledge model based on the user input corresponding to the passive-navigation portion, the general-navigation portion, or a combination thereof.

6. The method as claimed in claim 1 wherein calculating the system route includes calculating the system route including a system-passive portion, a system-general portion, or a combination thereof based on the navigation route and the user geographic-knowledge model for controlling the guidance communication for the system route based on the navigation route previously utilized by the system user.

7. The method as claimed in claim 6 further comprising calculating a trigger mechanism including a buffer location, a buffer time, or a combination thereof for controlling a hardware status of a device guiding the system user to traverse the system route.

8. The method as claimed in claim 6 further comprising:
determining a user history based on the navigation route for representing locations previously visited by the system user;
calculating a user driving pattern for representing the system user;
determining a goal-cost difference for comparing the system route with the user driving pattern; and
wherein:
calculating the system route includes calculating the system route including a system-general portion based on the goal-cost difference relative to the user driving pattern.

9. The method as claimed in claim 6 wherein calculating the system route includes calculating the system route for controlling a hardware status for a location circuit, a user interface, or a combination thereof.

10. The method as claimed in claim 6 further comprising:
determining a user history based on the navigation route for representing locations previously visited by the system user;
determining a familiarity distribution function associated with a path irregularity, a locations-correlation measure, or a combination thereof for representing a relationship between a location previously visited by the system user and a further location not previously visited by the system user; and
calculating a user familiarity estimate based on the familiarity distribution function associated with the user history for estimating a familiarity of the system user for a location not included in the user history.

11. A navigation system comprising:
a control circuit configured to:
receive user input regarding a navigation route for controlling guidance communication along the navigation route for a system user wherein the user input corresponds to a passive-navigation portion for representing one or more locations of the navigation route not requiring communication of the guidance communication for the system user;
generate a user geographic-knowledge model based on the user input regarding the navigation route;
calculate a system route based on the user geographic-knowledge model;
communicate the system route for guiding the system user in traversing the system route; and
a storage circuit, coupled to the control circuit, configured to store the user geographic-knowledge model.

12. The system as claimed in claim 11 wherein the control circuit is configured to:
determine a user history based on the navigation route for representing locations previously visited by the system user;
calculate a point density based on the user history for representing concentration of locations previously visited by the system user; and
generate the user geographic-knowledge model based on the point density for estimating a familiarity of the system user for a geographic area.

13. The system as claimed in claim 11 wherein the control circuit is configured to:
determine a user history based on the navigation route including the passive-navigation portion, a general-navigation portion, or a combination thereof for limiting the guidance communication for one or more locations of the navigation route previously utilized the system user;
calculate a guidance weight based on the passive-navigation portion, the general-navigation portion, or a combination thereof according to the user history; and
generate the user geographic-knowledge model based on the guidance weight.

14. The system as claimed in claim 11 wherein the control circuit is configured to:
determine a user history based on the navigation route for representing locations previously visited by the system user;
determine a familiarity distribution function associated with the user history for calculating a user familiarity estimate for the system user regarding a location not included in the user history; and
generate the user geographic-knowledge model based on the user familiarity estimate and the familiarity distribution function.

15. The system as claimed in claim 11 wherein the control circuit is configured to:
receive the user input corresponding to a general-navigation portion for representing one or more further locations of the navigation route reducing the communication of the guidance communication; and
generate the user geographic-knowledge model based on the user input corresponding to the passive-navigation portion, the general-navigation portion, or a combination thereof.

16. A non-transitory computer readable medium including instructions for a navigation system comprising:
receiving user input regarding a navigation route for controlling guidance communication along the navigation route for a system user wherein the user input corresponds to a passive-navigation portion for representing one or more locations of the navigation route not requiring communication of the guidance communication for the system user;

generating a user geographic-knowledge model based on the user input regarding the navigation route;

calculating a system route based on the user geographic-knowledge model; and communicating the system route for guiding the system user in traversing the system route.

17. The non-transitory computer readable medium including the instructions as claimed in claim 16 further comprising:

determining a user history based on the navigation route for representing locations previously visited by the system user;

calculating a point density based on the user history for representing concentration of locations previously visited by the system user; and wherein:

generating the user geographic-knowledge model includes generating the user geographic-knowledge model based on the point density for estimating a familiarity of the system user for a geographic area.

18. The non-transitory computer readable medium including the instructions as claimed in claim 16 further comprising:

determining a user history based on the navigation route including the passive-navigation portion, a general-navigation portion, or a combination thereof for limiting the guidance communication for one or more locations of the navigation route previously utilized the system user;

calculating a guidance weight based on the passive-navigation portion, the general-navigation portion, or a combination thereof according to the user history; and wherein:

generating the user geographic-knowledge model includes generating the user geographic-knowledge model based on the guidance weight.

19. The non-transitory computer readable medium including the instructions as claimed in claim 16 further comprising:

determining a user history based on the navigation route for representing locations previously visited by the system user;

determining a familiarity distribution function associated with the user history for calculating a user familiarity estimate for the system user regarding a location not included in the user history; and wherein:

generating the user geographic-knowledge model includes generating the user geographic-knowledge model based on the user familiarity estimate and the familiarity distribution function.

20. The non-transitory computer readable medium including the instructions as claimed in claim 16 wherein:

receiving the user input includes receiving the user input corresponding a general-navigation portion for representing one or more further locations of the navigation route reducing the communication of the guidance communication, or a combination thereof; and generating the user geographic-knowledge model includes generating the user geographic-knowledge model based on the user input corresponding to the passive-navigation portion, the general-navigation portion, or a combination thereof.

* * * * *